United States Patent
Chai

(10) Patent No.: US 12,068,868 B2
(45) Date of Patent: Aug. 20, 2024

(54) CHARGING PROCESSING METHOD AND SYSTEM, AND RELATED DEVICE

(71) Applicant: HUAWEI TECHNOLOGIES CO., LTD., Guangdong (CN)

(72) Inventor: Xiaoqian Chai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 17/502,009

(22) Filed: Oct. 14, 2021

(65) Prior Publication Data

US 2022/0045874 A1    Feb. 10, 2022

Related U.S. Application Data

(63) Continuation of application No. PCT/CN2020/100259, filed on Jul. 3, 2020.

(30) Foreign Application Priority Data

Jul. 19, 2019   (CN) .......................... 201910656808.8

(51) Int. Cl.
*H04L 12/14* (2024.01)
*H04L 5/00* (2006.01)
*H04M 15/00* (2006.01)

(52) U.S. Cl.
CPC ........ *H04L 12/1403* (2013.01); *H04L 5/0055* (2013.01); *H04M 15/64* (2013.01); *H04M 15/65* (2013.01); *H04M 15/66* (2013.01)

(58) Field of Classification Search
CPC ... H04L 12/1403; H04L 5/0055; H04L 12/14; H04M 15/64; H04M 15/65; H04M 15/66;
(Continued)

(56) References Cited

U.S. PATENT DOCUMENTS

| | | | | |
|---|---|---|---|---|
| 9,576,307 B2 * | 2/2017 | Cassel | ..................... | G06Q 30/04 |
| 2010/0211643 A1 * | 8/2010 | Lowenthal | .............. | B60L 53/14 |
| | | | | 709/206 |

(Continued)

FOREIGN PATENT DOCUMENTS

| | | |
|---|---|---|
| CN | 101022348 A | 8/2007 |
| CN | 102271321 A | 12/2011 |

(Continued)

OTHER PUBLICATIONS

3GPP TR 32.845 V0.4.0 (Apr. 2019)3rd Generation Partnership Project;Technical Specification Group Services and System Aspects;Charging management;Study on Charging Aspects of Network Slicing; (Release 16), Total 19 Pages.

(Continued)

*Primary Examiner* — Don N Vo
(74) *Attorney, Agent, or Firm* — HUAWEI TECHNOLOGIES CO., LTD.

(57) ABSTRACT

A charging processing method includes: when a charging processing device for a user service is unavailable, storing charging data of the user service during the failure period, where the charging data includes charging data that is not sent or charging data that is not processed; and after it is determined that a charging processing device for the user service transitioned from "unavailable" to "available", sending a charging request message that includes the charging data during the failure period to the available charging processing device, so that the available charging processing device performs charging processing on the charging data before a charging processing device transitioned to "available". In this method, when the charging processing device or a network is faulty, interruption of the user service can be avoided, and a loss caused for an operator can be avoided.

21 Claims, 13 Drawing Sheets

(58) Field of Classification Search
CPC ...... H04M 15/70; H04M 15/73; H04M 15/74; H04M 15/853; H04M 15/854; H04M 15/856; H04W 4/24
USPC ........................................................ 455/406
See application file for complete search history.

(56) References Cited

U.S. PATENT DOCUMENTS

| | | | | |
|---|---|---|---|---|
| 2015/0016307 | A1* | 1/2015 | Liu | H04M 15/77 370/259 |
| 2020/0023747 | A1* | 1/2020 | Logvinov | B60L 53/66 |
| 2020/0317074 | A1* | 10/2020 | Miller | G01C 21/3664 |

FOREIGN PATENT DOCUMENTS

| | | | |
|---|---|---|---|
| CN | 103874044 A | | 6/2014 |
| CN | 106454788 A | | 2/2017 |
| EP | 3301957 A1 | | 4/2018 |
| WO | 2014049433 A2 | | 4/2014 |
| WO | 2018152031 A1 | | 8/2018 |

OTHER PUBLICATIONS

3GPP TS 32.255 V16.1.0 (Jun. 2019)3rd Generation Partnership Project;Technical Specification Group Services and System Aspects;Telecommunication management;Charging management;5G data connectivity domain charging;stage 2(Release 16), Total 72 Pages.

3GPP TS 32.290 V16.1.0 (Jun. 2019)3rd Generation Partnership Project;Technical Specification Group Services and System Aspects; Telecommunication management; Charging management; 5G system; Services, operations and procedures of charging using Service Based Interface (SBI) (Release 16), Total 29 Pages.

* cited by examiner

Second charging request message

First charging request message

CHARGING PROCESSING METHOD AND SYSTEM, AND RELATED DEVICE

CROSS-REFERENCE TO RELATED APPLICATIONS

This application is a continuation of International Application No. PCT/CN2020/100259, filed on Jul. 3, 2020, which claims priority to Chinese Patent Application No. 201910656808.8, filed on Jul. 19, 2019. The disclosures of the aforementioned applications are hereby incorporated by reference in their entireties.

TECHNICAL FIELD

This application relates to the communications field, and in particular, to a method, a system, and a related device for performing charging processing on a service accessed by user equipment.

BACKGROUND

A charging system is one of key systems in a telecom operation support system, and directly relates to economic interests of an operator and a user. The industry imposes a high requirement on stability of the charging system: When a charging server (providing an online charging service and/or an offline charging service) is unavailable, it is necessary to ensure that user equipment can continue to use a telecommunications network, and charging data of a service used by the user can be continuously collected, so as to avoid a loss caused for the operator to the greatest extent.

A current charging system of a 3G (3rd Generation, 3rd generation) network or a 4G (4th Generation, 4th generation) network includes two sets of charging systems: an online charging server and an offline charging server. When the online charging system is unavailable, the offline charging system (the offline charging system is usually deployed on a service side or a network side) may be used, to perform offline charging processing on a service corresponding to the user equipment, thereby ensuring that a user service is not affected.

However, a charging system of a 5G (5th Generation, 5th generation) network has been evolved to better serve the 5G network and a service: A CHF (Charging Function) device of the 5G network converges a conventional online charging capability and an offline charging capability to provide an online and offline converged charging service, which is deployed independently of a service or a network. One CHF device or an active CHF device and a standby CHF device may be configured for a service. When the active CHF device is unavailable, for example, when the active CHF device cannot be accessed because the active CHF device is faulty or a network connection between a charging trigger device and the active CHF device is faulty, the standby CHF device may be used for charging processing.

On the 5G network, when a CHF device that provides a charging processing function for a user service is unavailable (when only one CHF device is configured for the user service, it indicates that the CHF device is unavailable, or when an active CHF device and a standby CHF device are configured for the user service, it indicates that both the active CHF device and the standby CHF device are unavailable), charging processing cannot be performed on a service accessed by user equipment, and consequently the user equipment is disconnected from a network, or an economic loss is caused for an operator.

SUMMARY

In view of this, it is necessary to provide a charging processing method, so that when a charging processing device for a user service is unavailable, charging processing can still be performed on the user service. In this way, interruption of the user service can be avoided, and a loss caused for an operator can be avoided.

According to a first aspect, an embodiment of this application provides a charging system. The charging system includes a charging trigger device and a charging processing device.

The charging trigger device is configured to: determine that a charging processing device for a user service transitioned from "unavailable" to "available"; and send a first charging request message for the service to the available charging processing device. The first charging request message includes first charging data and/or first information of the service.

The charging processing device is configured to: receive the first charging request message from the charging trigger device; and perform charging processing on the service based on the first charging request message.

The first charging data includes charging data that is not sent or charging data that is not processed because a charging processing device for the service is unavailable. The charging data that is not sent is charging data that is not sent by the charging trigger device to a charging processing device, and the charging data that is not processed is charging data for which the charging trigger device does not receive a charging processing result from a charging processing device.

The first information indicates that a reason for reporting the first charging request message is that a charging processing device for the user service transitioned to "available".

The charging system enables the charging trigger device to record or store charging data (that is, charging data that is not sent or charging data that is not processed) when the charging processing device for the user service is unavailable, and send, after it is determined that a charging processing device for the user service transitioned to "available", the first charging request message obtained based on the recorded charging data to the available charging processing device, so that the available charging processing device can perform charging processing on the service. In this way, interruption of the user service can be avoided, and missing charging or incorrect charging can be avoided, thereby avoiding a loss caused for an operator.

In a possible solution, before sending the first charging request message to the available charging processing device, the charging trigger device is further configured to: determine that a charging processing device for the service is unavailable; and obtain the first charging request message based on a second charging request message.

The second charging request message includes a charging request message that is not sent or a charging request message for which no response is received because a charging processing device for the service is unavailable. The charging request message that is not sent is a charging request message that is not sent by the charging trigger device to a charging processing device, and the charging request message for which no response is received is a charging request message for which the charging trigger device does not receive a charging response message from a charging processing device.

In a possible solution, the second charging request message includes usage data of the service and a corresponding quota indicator, and the charging trigger device is further configured to: add the usage data and the quota indicator to the first charging data in the first charging request message, where the quota indicator indicates that the usage data is usage data with a quota; or add the usage data to the first charging data in the first charging request message, where the first charging data indicates that the usage data is usage data without a quota.

In a possible solution, the second charging request message includes usage data of the service and a corresponding quota indicator, and the charging trigger device is further configured to add the usage data to the first charging data in the first charging request message, where the first charging data indicates that the usage data is usage data with a quota.

In a possible solution, the second charging request message includes usage data of the service and a corresponding no-quota indicator, and the charging trigger device is further configured to add the usage data and the no-quota indicator to the first charging data in the first charging request message, where the no-quota indicator indicates that the usage data is usage data without a quota.

In a possible solution, before sending the first charging request message to the available charging processing device, the charging trigger device is further configured to: determine that a charging processing device for the service is unavailable; obtain usage data of the service; and obtain the first charging request message based on the usage data.

In a possible solution, if the first charging data in the first charging request message includes usage data of the service, and the first charging data indicates that the usage data is usage data without a quota, that the charging processing device is configured to perform charging processing on the service based on the first charging request message specifically includes: determining that a first charging data record corresponding to the service does not exist in the charging processing device; and creating the first charging data record based on the first charging request message.

In a possible solution, if the first charging data in the first charging request message includes usage data of the service and a no-quota indicator, and the no-quota indicator indicates that the usage data is usage data without a quota, that the charging processing device is configured to perform charging processing on the service based on the first charging request message specifically includes: determining that a first charging data record corresponding to the service does not exist in the charging processing device; and creating the first charging data record based on the first charging request message.

In a possible solution, if the first charging data in the first charging request message includes usage data of the service, and the first charging data indicates that the usage data is usage data without a quota, that the charging processing device is configured to perform charging processing on the service based on the first charging request message specifically includes: releasing a service unit quota corresponding to the usage data and existing in the charging processing device.

In a possible solution, if the first charging data in the first charging request message includes usage data of the service and a no-quota indicator, and the no-quota indicator indicates that the usage data is usage data without a quota, that the charging processing device is configured to perform charging processing on the service based on the first charging request message specifically includes: releasing a service unit quota corresponding to the usage data and existing in the charging processing device.

In a possible solution, if the first charging data in the first charging request message includes usage data of the service, and the first charging data indicates that the usage data is usage data with a quota, that the charging processing device is configured to perform charging processing on the service based on the first charging request message specifically includes: determining that a service unit quota corresponding to the usage data does not exist in the charging processing device; and performing deduction processing on a user account based on the usage data.

In a possible solution, if the first charging data in the first charging request message includes usage data of the service and a quota indicator, and the quota indicator indicates that the usage data is usage data with a quota, that the charging processing device is configured to perform charging processing on the service based on the first charging request message specifically includes: determining that a service unit quota corresponding to the usage data does not exist in the charging processing device; and performing deduction processing on a user account based on the usage data.

In a possible solution, the charging processing device is further configured to determine that the first charging data in the first charging request message is not retransmitted charging data.

In a possible solution, before receiving the first charging request message, the charging processing device is further configured to: send a fault processing policy to the charging trigger device, where the fault processing policy is used to indicate the charging trigger device to send, after a charging processing device for the service transitioned from "unavailable" to "available", the first charging request message for the service to the available charging processing device.

According to a second aspect, an embodiment of this application provides a charging method, applied to a charging trigger device. The method includes: determining that a charging processing device for a user service transitioned from "unavailable" to "available"; and sending a first charging request message for the service to the available charging processing device, where the first charging request message includes first charging data and/or first information of the service.

In a possible solution, before the sending a first charging request message to the available charging processing device, the method further includes: determining that a charging processing device for the service is unavailable; and obtaining the first charging request message based on a second charging request message.

In a possible solution, the obtaining the first charging request message based on a second charging request message is specifically: obtaining the first charging request message based on one second charging request message; and storing the first charging request message; or the obtaining the first charging request message based on a second charging request message is specifically: storing at least one second charging request message; and after determining that a charging processing device for the service transitioned from "unavailable" to "available", obtaining the first charging request message based on the at least one second charging request message.

In a possible solution, if the second charging request message includes usage data of the service and a corresponding quota indicator, the first charging data in the obtained first charging request message includes the usage data, and the first charging data indicates that the usage data is usage data with a quota, or the first charging data in the obtained first charging request message includes the usage data, and the first charging data indicates that the usage data is usage data without a quota.

In a possible solution, if the second charging request message includes usage data of the service and a quota indicator, the first charging data in the obtained first charging request message includes the usage data and a quota indicator, and the quota indicator indicates that the usage data is usage data with a quota, or the first charging data in the obtained first charging request message includes the usage data and a no-quota indicator, and the no-quota indicator indicates that the usage data is usage data without a quota.

In a possible solution, if the second charging request message includes usage data of the service and a corresponding no-quota indicator, the first charging data in the obtained first charging request message includes the usage data, and the first charging data indicates that the usage data is usage data without a quota.

In a possible solution, if the second charging request message includes usage data of the service and a corresponding no-quota indicator, the first charging data in the obtained first charging request message includes the usage data and a no-quota indicator, and the no-quota indicator indicates that the usage data is usage data without a quota.

In a possible solution, when the first charging request message includes the first charging data, the first charging request message further includes second information, and the second information indicates that the first charging request message includes the first charging data.

In a possible solution, when the first charging request message includes the first charging data of the service, the first charging request message further includes third information, and the third information is used to determine that the first charging data is retransmitted data.

In a possible solution, the third information includes a charging resource identifier corresponding to the service and a serial number of the second charging request message.

In a possible solution, the third information further includes a retransmission indicator, and the retransmission indicator indicates that the first charging data is retransmitted data.

In a possible solution, if a charging mode of the service is online charging, after the determining that a charging processing device for the service is unavailable, the method further includes: performing an offline charging operation on the service, or granting a virtual quota to the service, where the virtual quota is a quota virtually granted by the charging trigger device locally.

In a possible solution, before the sending a first charging request message to the available charging processing device, the method further includes: determining that a charging processing device for the service is unavailable; obtaining usage data of the service; and obtaining the first charging request message based on the usage data.

In a possible solution, if a charging mode of the service is offline charging, the method further includes: performing an offline charging operation on the service to obtain the usage data, where the first charging data in the obtained first charging request message includes the usage data, and the first charging data indicates that the usage data is usage data without a quota.

In a possible solution, if a charging mode of the service is offline charging, the method further includes: performing an offline charging operation on the service to obtain the usage data, where the first charging data in the obtained first charging request message includes the usage data and a no-quota indicator, and the no-quota indicator indicates that the usage data is usage data without a quota.

In a possible solution, if a charging mode of the service is online charging, the method further includes: performing an online charging operation on the service to obtain the usage data, where the first charging data in the obtained first charging request message includes the usage data, and the first charging data indicates that the usage data is usage data with a quota; or the method further includes: performing an offline charging operation on the service to obtain the usage data, where the first charging data in the obtained first charging request message includes the usage data, and the first charging data indicates that the usage data is usage data without a quota.

In a possible solution, if a charging mode of the service is online charging, the method further includes: performing an online charging operation on the service to obtain the usage data, where the first charging data in the obtained first charging request message includes the usage data and a quota indicator, and the quota indicator indicates that the usage data is usage data with a quota; or the method further includes: performing an offline charging operation on the service to obtain the usage data, where the first charging data in the obtained first charging request message includes the usage data and a no-quota indicator, and the no-quota indicator indicates that the usage data is usage data without a quota.

In a possible solution, the obtaining the first charging request message based on the usage data is specifically: when a charging reporting condition of an immediate reporting type of the service is met, obtaining the first charging request message based on the usage data; or the obtaining the first charging request message based on the usage data is specifically: when a charging reporting condition of an immediate reporting type of the service is met, storing the usage data; and before sending the first charging request message to the available charging processing device, generating the first charging request message based on the stored usage data.

In a possible solution, before the sending a first charging request message to the available charging processing device, the method further includes: obtaining a fault processing policy, where the fault processing policy is used to indicate the charging trigger device to send, after a charging processing device for the service transitioned from "unavailable" to "available", the first charging request message for the service to the available charging processing device; and the obtaining a fault processing policy includes: reading the fault processing policy from local configuration information; or receiving the fault processing policy from the charging processing device; or receiving the fault processing policy from a policy control function PCF device.

According to a third aspect, an embodiment of this application provides a charging method, applied to a charging processing device. The method includes: receiving a first charging request message for a user service from a charging trigger device, where the first charging request message includes first charging data and/or first information of the service; and performing charging processing on the service based on the first charging request message.

In a possible solution, when the first charging request message includes the first charging data, the first charging request message further includes second information, and the second information indicates that the first charging request message includes the first charging data.

In a possible solution, if the first charging data in the first charging request message includes usage data of the service, and the first charging data indicates that the usage data is usage data without a quota, the performing charging processing on the service based on the first charging request message specifically includes: writing the usage data into a first charging data record corresponding to the service.

In a possible solution, if the first charging data in the first charging request message includes usage data of the service and a no-quota indicator, and the no-quota indicator indicates that the usage data is usage data without a quota, the performing charging processing on the service based on the first charging request message specifically includes: writing the usage data into a first charging data record corresponding to the service.

In a possible solution, if the first charging data in the first charging request message includes usage data of the service, and the first charging data indicates that the usage data is usage data without a quota, the performing charging processing on the service based on the first charging request message specifically includes: determining that a first charging data record corresponding to the service does not exist in the charging processing device; and creating the first charging data record based on the first charging request message.

In a possible solution, if the first charging data in the first charging request message includes usage data of the service and a no-quota indicator, and the no-quota indicator indicates that the usage data is usage data without a quota, the performing charging processing on the service based on the first charging request message specifically includes: determining that a first charging data record corresponding to the service does not exist in the charging processing device; and creating the first charging data record based on the first charging request message.

In a possible solution, if the first charging data in the first charging request message includes usage data of the service, and the first charging data indicates that the usage data is usage data without a quota, after the receiving a first charging request message from a charging trigger device, the method further includes: releasing a service unit quota corresponding to the usage data and existing in the charging processing device.

In a possible solution, if the first charging data in the first charging request message includes usage data of the service and a no-quota indicator, and the no-quota indicator indicates that the usage data is usage data without a quota, after the receiving the first charging request message from the charging trigger device, the method further includes: releasing a service unit quota corresponding to the usage data and existing in the charging processing device.

In a possible solution, if the first charging data in the first charging request message includes usage data of the service, and the first charging data indicates that the usage data is usage data with a quota, the performing charging processing on the service based on the first charging request message specifically includes: determining that a service unit quota corresponding to the usage data exists in the charging processing device; and performing deduction processing on a user account based on the usage data and the service unit quota.

In a possible solution, if the first charging data in the first charging request message includes usage data of the service and a quota indicator, and the quota indicator indicates that the usage data is usage data with a quota, the performing charging processing on the service based on the first charging request message specifically includes: determining that a service unit quota corresponding to the usage data exists in the charging processing device; and performing deduction processing on a user account based on the usage data and the service unit quota.

In a possible solution, if the first charging data in the first charging request message includes usage data of the service, and the first charging data indicates that the usage data is usage data with a quota, the performing charging processing on the service based on the first charging request message specifically includes: determining that a service unit quota corresponding to the usage data does not exist in the charging processing device; and performing deduction processing on a user account based on the usage data.

In a possible solution, if the first charging data in the first charging request message includes usage data of the service and a quota indicator, and the quota indicator indicates that the usage data is usage data with a quota, the performing charging processing on the service based on the first charging request message specifically includes: determining that a service unit quota corresponding to the usage data does not exist in the charging processing device; and performing deduction processing on a user account based on the usage data.

In a possible solution, the method further includes: determining that the deduction processing performed on the user account based on the usage data fails; and writing the usage data into a second charging data record corresponding to the service.

In a possible solution, if the first charging request message is a charging resource creation request message, the performing charging processing on the service based on the first charging request message further specifically includes: creating a charging resource based on the first charging request message.

In a possible solution, if the first charging request message is a charging resource update request message or a charging resource deletion request message, and the first charging request message further includes a charging resource identifier, the performing charging processing on the service based on the first charging request message further specifically includes: when a charging resource corresponding to the charging resource identifier does not exist in the charging processing device, creating the charging resource based on the first charging request message.

In a possible solution, before the performing charging processing on the service based on the first charging request message, the method further includes: determining that the first charging data in the first charging request message is not retransmitted charging data.

In a possible solution, if the first charging request message is a charging resource creation request message, and the first charging data includes service information of the service, the determining that the first charging data in the first charging request message is not retransmitted charging data specifically includes: determining, based on the service information, that a charging resource created based on the first charging data does not exist in the charging processing device.

In a possible solution, before the receiving a first charging request message, the method further includes: sending a fault processing policy to the charging trigger device, where the fault processing policy is used to indicate the charging trigger device to send, after a charging processing device for the service transitioned from "unavailable" to "available", the first charging request message for the service to the available charging processing device.

According to a fourth aspect, an embodiment of this application provides a charging trigger device. The charging trigger device includes a processor and a memory. The memory is configured to store program instructions. The processor is configured to invoke and execute the program instructions stored in the memory, so that the charging trigger device performs the charging method in the second aspect.

According to a fifth aspect, an embodiment of this application provides a computer-readable storage medium, including instructions. When the instructions are run on a computer, the computer is enabled to perform the charging method in the second aspect.

According to a sixth aspect, an embodiment of this application provides a charging processing device. The charging processing device includes a processor and a memory. The memory is configured to store program instructions. The processor is configured to invoke and execute the program instructions stored in the memory, so that the charging processing device performs the charging method in the third aspect.

According to a seventh aspect, an embodiment of this application provides a computer-readable storage medium, including instructions. When the instructions are run on a computer, the computer is enabled to perform the charging method in the third aspect.

According to an eighth aspect, an embodiment of this application provides a chip. The chip includes a programmable logic circuit and/or a program instruction, and when being running, the chip is configured to implement the method in the second aspect or any possible implementation of the second aspect, or the method in the third aspect or any possible implementation of the third aspect.

DESCRIPTION OF EMBODIMENTS

The following describes the technical solutions in the embodiments of this application with reference to the accompanying drawings in the embodiments of this application. In the descriptions of this application, "/" represents an "or" relationship between associated objects unless otherwise specified. For example, AB may represent A or B. The term "and/or" in this application indicates an association relationship for describing associated objects and indicates that three relationships may exist. For example, A and/or B may indicate the following three cases: Only A exists, both A and B exist, and only B exists, where A and B may be singular or plural. In addition, unless otherwise specified, "a plurality of" in the descriptions of this application means two or more. "At least one of the following" or a similar expression thereof indicates any combination of the following, including any combination of one or more of the following. For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

Figure 1:
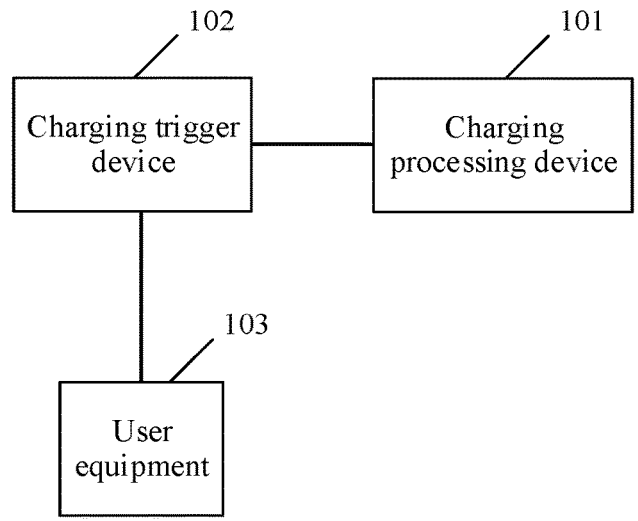
FIG. 1 is an architectural diagram of a charging system according to an embodiment of this application.

FIG. 1 is an architectural diagram of a charging system according to an embodiment of this application. The charging system includes at least a charging processing device 101, a charging trigger device 102, user equipment 103, and the like. Main functions of these devices are separately described as follows:

The charging trigger device 102 is mainly responsible for obtaining charging data of a user service (that is, a service of a user) (including usage data collection, quota application, and the like), reporting (it should be noted that "reporting" described in the embodiments of this application is sending to the charging processing device), local quota management, and the like. The functions of the charging trigger device 102 include but are not limited to the following:

(1) When a charging processing device for a user service is available, the charging trigger device 102 allows the user service, obtains charging data of the user service, and when a charging reporting condition is met, reports the obtained charging data to the charging processing device (for example, the charging processing device 101) through a charging request message for charging processing. "Allowing the user service" includes enabling user equipment to normally access the user service. "The charging processing device for the user service" is a charging processing device that can perform charging processing on the user service according to a system configuration. In this sense, a charging processing device that is in a normal working state but is not set to perform charging processing on the user service cannot be referred to as "the charging processing device for the user service". A quantity of charging processing devices for the user service may vary with a deployment status of the charging system.

(2) When the charging processing device for the user service is unavailable, the charging trigger device 102 continues to allow the user service.

In addition, the charging trigger device 102 obtains charging data of the user service, and stores the obtained charging data in the charging trigger device as charging data that is not sent.

Alternatively, the charging trigger device 102 obtains charging data of the user service, obtains a first charging request message based on the obtained charging data, and stores the first charging request message in the charging trigger device.

Alternatively, the charging trigger device 102 obtains a second charging request message, obtains a first charging request message based on the second charging request message, and stores the first charging request message in the charging trigger device.

Alternatively, the charging trigger device 102 obtains a second charging request message, and stores the second charging request message in the charging trigger device.

For ease of understanding, some concepts described above are explained as follows:

A service or a user service is a service accessed or used by user equipment (for example, the user equipment 103) of a user, and may be but is not limited to: a data connection service (for example, a protocol data unit (PDU) session of a 5G data connection, or a data flow in a PDU session, or a data flow that is in a PDU session and that corresponds to a rating group (RG), or a data flow that is in a PDU session and that corresponds to an RG and a service identifier may be understood as the service in the embodiments of this application), a voice call service, a short message service, a content service, an API (Application Program Interface) service, or the like. In the embodiments of this application, a service corresponding to a charging resource and a service corresponding to a charging method (that is, online charging or offline charging) may be a same service, or may be services in different ranges. For example, for a data connection service, the service corresponding to the charging resource is a PDU session of the data connection, and the service corresponding to the charging method may be a PDU session or a data flow corresponding to an RG in a PDU session. For the charging resource in this application, refer to a charging data resource defined in the 3GPP (3rd Generation Partnership Project) standard specification TS 32.290. The charging resource represents a set of different charging information created by a CHF device for charging. After creating a corresponding charging resource for a user service, the CHF device may assign an identifier to the charging resource, and the identifier is referred to as a charging resource identifier.

Usage data is usage data of a user service, for example, traffic or duration, and is provided for a charging processing device (for example, the charging processing device 101), so that the charging processing device performs charging processing on a user corresponding to user equipment that accesses or uses the service. Usage data of a data connection service may include information such as uplink data traffic, downlink data traffic, or duration. Usage data of a voice call service may include information such as call duration. Content and a form of the service accessed by the user equipment and content and a form of the usage data used for charging processing are not limited in the embodiments of this application.

Charging data is data obtained by a charging trigger device for charging processing when user equipment uses a service, and may include usage data of the user service (for example, a used unit defined in the 3GPP standard specification) and/or a service unit quota request of the user service (for example, a requested unit defined in the 3GPP standard specification), and other information of the user service that may be used for charging processing. A service unit quota is a limit for which the charging trigger device (for example, the charging trigger device 102) applies to a charging processing device (for example, the charging processing device 101) and that is used for controlling access or use of the user service. For example, for a data connection service, the service unit quota may be traffic (for example, 5 M), and the quota indicates that the charging trigger device may allow the user equipment to use a maximum of 5 M data traffic. For ease of description, in the embodiments of this application, the "service unit quota" is sometimes directly referred to as a "quota", and the "service unit quota request" is briefly referred to as a "quota request".

Charging data that is not sent is charging data that needs to be sent according to a charging reporting condition, but is not sent by a charging trigger device to a charging processing device for a user service because the charging processing device is unavailable. For example, in the embodiments of this application, charging data that is not sent in a charging request message or charging data of an obtained user service may be referred to as the charging data that is not sent.

Charging data that is not processed is charging data that has been sent by a charging trigger device to a charging processing device for a user service according to a charging reporting condition, but for which no charging processing result is received from the charging processing device because the charging processing device is unavailable. For example, in the embodiments of this application, charging data for which no response is received in a charging request message may be considered as the charging data that is not processed.

First charging data: For ease of description, in the embodiments of this application, charging data that is not sent and charging data that is not processed are collectively referred to as the first charging data. Because the first charging data is generated when a charging processing device for a user service is unavailable, or is caused because a charging processing device for a user service is unavailable, the first charging data in the embodiments of this application may also be referred to as "charging data during the unavailability period" or "charging data during the failure period".

A charging request message is a request message sent by a charging trigger device to a charging processing device to enable the charging processing device to perform charging processing on a user service. The charging request message carries charging data.

A conventional charging request message is a charging request message sent when a charging processing device for a user service is available, and relates to the current technology. Details are not described in the embodiments of this application. However, for ease of description, the charging request message is referred to as the conventional charging request message in the embodiments of this application.

A charging request message that is not sent is a charging request message that is not sent by a charging trigger device to a charging processing device for a user service because the charging processing device is unavailable.

A charging request message for which no response is received is a charging request message for which no charging response message is received by a charging trigger device from a charging processing device for a user service because the charging processing device is unavailable.

Second charging request message: For ease of description, in the embodiments of this application, a charging request message that is not sent and a charging request message for which no response is received are collectively referred to as the second charging request message. Because the second charging request message is generated when a charging processing device for a user service is unavailable, or is caused because a charging processing device for a user service is unavailable, the second charging request message in the embodiments of this application may also be referred to as a "charging request message during the unavailability period" or a "charging request message during the failure period".

A first charging request message is a charging request message sent by a charging trigger device to an available charging processing device for a user service, after determining that a charging processing device transitioned from "unavailable" to "available", to perform charging processing on first charging data or charging data in a second charging request message. The first charging request message may have the following plurality of possibilities:

The first charging request message may include first information. The first information indicates that a reason for reporting the first charging request message is that a charging processing device for the user service transitioned to "available", and the charging processing device may perform charging processing based on the first information, for example, create or recover a charging resource for the user service. For details, refer to other embodiments of this application.

Alternatively, the first charging request message may include first charging data. The charging processing device may perform charging processing based on the first charging data, for example, write usage data in the charging data into a charging data record. The charging processing device may determine, based on information in the charging data, for example, a timestamp, that the first charging request message includes the first charging data. For details, refer to other embodiments of this application.

Alternatively, the first charging request message may include first charging data and first information, and the charging processing device may perform charging processing based on the first charging data and the first information. For details, refer to other embodiments of this application. In a possible implementation solution, the first information may be further used to enable the charging processing device to identify or determine that the first charging request message includes the first charging data.

Alternatively, the first charging request message may include first charging data and second information, and the charging processing device may perform charging processing based on the first charging data and the second information. For details, refer to other embodiments of this application. The second information indicates that the first charging request message includes the first charging data. In a possible implementation solution, the second information may be further used to enable the charging processing device to determine that a reason for reporting the first charging request message is that a charging processing device for the user service transitioned to "available", so that the charging processing device can correctly perform charging processing on the first charging data.

Alternatively, the first charging request message may include first charging data and third information, and the charging processing device may perform charging processing based on the first charging data and the third information. For details, refer to other embodiments of this application. The third information is used to enable the charging processing device to determine whether the first charging data is retransmitted data, thereby preventing the charging processing device from performing repeated charging processing.

Alternatively, the first charging request message may include first charging data, first information, and second information, and the charging processing device may perform charging processing based on the first charging data, the first information, and the second information. Functions of the first information and the second information are the same as those described above.

Alternatively, the first charging request message may include first charging data, first information, and third information, and the charging processing device may perform charging processing based on the first charging data, the first information, and the third information. Functions of the first information and the third information are the same as those described above.

Alternatively, the first charging request message may include first charging data, second information, and third information, and the charging processing device may perform charging processing based on the first charging data, the second information, and the third information. Functions of the second information and the third information are the same as those described above.

Alternatively, the first charging request message may include first charging data, first information, second information, and third information, and the charging processing device may perform charging processing based on the first charging data, the first information, the second information, and the third information. Functions of the first information, the second information, and the third information are the same as those described above.

The first information, the second information, and the third information are used to enable the available charging processing device to correctly process the first charging data in the first charging request message. For detailed processing logic, refer to subsequent embodiments of this application. For specific content included in the first charging request message, refer to subsequent embodiments of this application, for example, embodiments corresponding to FIG. 2A and FIG. 2B. Implementation formats and relative locations of the first charging data and auxiliary information such as the first information, the second information, and the third information in the first charging request message are not limited in the embodiments of this application. In other words, the first charging data and the auxiliary information such as the first information, the second information, and the third information may be parallel in the charging message (for example, the first information, the second information, or the third information may be located outside a data structure corresponding to the first charging data), or may be nested in the charging message (for example, the first information, the second information, or the third information may be located in a location in a data structure corresponding to the first charging data).

(3) After a charging processing device for the user service transitioned from "unavailable" to "available", the charging trigger device 102 sends the first charging request message to the available charging processing device. The first charging request message may be obtained based on the stored first charging data or the stored second charging request message. For details, refer to a subsequent embodiment of this application, for example, an embodiment corresponding to FIG. 5E.

The charging trigger device in the embodiments of this application may be a CTF (Charging Trigger Function) device defined in the 3GPP standard specification. For ease of description, in the embodiments of this application, the charging trigger device is sometimes directly referred to as a CTF device.

Determining of "unavailable" and "recovered to available" of the charging processing device for the user service in the present invention is described in the following two cases:

(1) When there is only one charging processing device for the user service (for example, the charging processing device 101), if the charging trigger device detects that the charging processing device is in an unavailable state, the charging trigger device may determine that "a charging processing device for the user service is unavailable". If it is detected that the charging processing device in the unavailable state transitioned to an available state, the charging trigger device may determine that "a charging processing device for the user service transitioned from "unavailable" to "available"". For ease of description, unless otherwise specified, the embodiments of this application are mainly described by using an example in which there is only one charging processing device.

(2) When there are a plurality of charging processing devices for the user service (for example, the charging processing device 101 and a standby device of the charging processing device 101, where the standby device is not listed in FIG. 1), if it is detected that these charging processing devices are all in an unavailable state, the charging trigger device may determine that "a charging processing device for the user service is unavailable". If it is detected that any one of these charging processing devices in the unavailable state transitioned to an available state, the charging trigger device may determine that "a charging processing device for the user service transitioned from "unavailable" to "available"". The case in which there are a plurality of charging processing devices for the user service includes but is not limited to the following scenario: One active charging processing device and at least one standby charging processing device are deployed in the charging system. In this scenario, the available charging processing device may not be a charging processing device that originally provides a charging service for the charging trigger device.

"Available" or "available state", and "unavailable" or "unavailable state" of the charging processing device are relative to the charging triggering device and the user service, and are specifically described as follows:

"Available" or "available state" of the charging processing device includes the following case:

The charging trigger device may send a charging request message for the user service to the charging processing device, and may receive a corresponding charging response message within a preset time.

"Unavailable" or "unavailable state" of the charging processing device includes the following cases:

(1) The charging trigger device cannot send a charging request message for the user service to the charging processing device because of a network connection fault and the like.

(2) After sending a charging request message for the user service to the charging processing device, the charging trigger device does not receive a corresponding charging response message within a preset time because of an internal fault of the charging processing device and the like.

In a possible implementation, for a charging processing device in an unavailable state, the charging trigger device may send a dedicated detection message to the charging processing device to determine whether the charging processing device is available. The dedicated detection message may be a probe message instead of a charging request message.

When the user service is a 5G data connection service, the function of the charging trigger device may be deployed in an SMF (Session Management Function) device defined in the 3GPP specification. When the user service is a voice service, the function of the charging trigger device may be deployed in an AS (Application Server) or a CSCF (call session control function) device in an IMS (IP Multimedia Subsystem). A physical device in which the function of the charging trigger device is deployed is not limited in the embodiments of this application.

It should be understood that, during actual deployment, the charging system shown in FIG. 1 may have more charging trigger devices.

The charging processing device 101 may be configured to: receive a first charging request message from the charging trigger device 102, and perform charging processing on a user service based on the first charging request message. For example, the charging processing device 101 writes usage data included in charging data in the first charging request message into a charging data record, releases an existing quota, or performs deduction processing on a user account. For details, refer to a subsequent embodiment of this application, for example, a method procedure corresponding to FIG. 7. The user account in the embodiments of this application is a charging account of a user, and details are not described.

In the embodiments of this application, the charging processing device may be a CHF (Charging Function) device defined in the 3GPP standard specification, or may be a CCS (Converged Charging System) device defined in the 3GPP standard specification, and includes a function of a CHF device. For ease of description, in the embodiments of this application, the charging processing device is sometimes directly referred to as the CHF device.

It should be understood that, during actual application, the charging system shown in FIG. 1 may have more charging processing devices. For example, a cluster may be constructed, and includes a plurality of charging processing devices, which are mutually backed up, so that a disaster recovery capability can be improved, and high availability can be achieved.

The user equipment 103 is a device of a terminal user, for example, a mobile phone, a notebook computer, a shared bicycle terminal, or a water/electricity/gas meter reading terminal. The charging trigger device 102 performs an online charging operation or an offline charging operation on a service used or accessed by the user equipment 103, and collects charging data. The offline charging operation is directly collecting or collecting statistics on usage of a user service, without controlling allowing of the service based on a quota. The online charging operation is controlling allowing of a service based on a quota, and collecting or collecting statistics on usage.

The embodiments of this application are mainly described by using an example in which the service accessed by the user equipment is a 5G data connection service. Correspondingly, the embodiments of this application are mainly described by using an example in which the charging data is data traffic-related information. The data traffic-related information includes but is not limited to: information about a PDU session collected by the charging trigger device, usage of an allowed service unit in the PDU session, a charging trigger condition, a timestamp, and the like.

It should be understood that, during actual deployment, the charging system shown in FIG. 1 may have more user equipments.

Based on the architecture shown in FIG. 1, such a charging method may be implemented: When a charging processing device for a user service is unavailable, data of the user service during the failure period is stored, including charging data that is not sent or charging data that is not processed. After it is determined that a charging processing device for the user service transitioned from "unavailable" to "available", a charging request message including the charging data during the failure period is sent to the available charging processing device, so that the available charging processing device performs charging processing on the charging data before a charging processing device transitioned to "available". For details, refer to subsequent embodiments of this application.

Figure 2A:
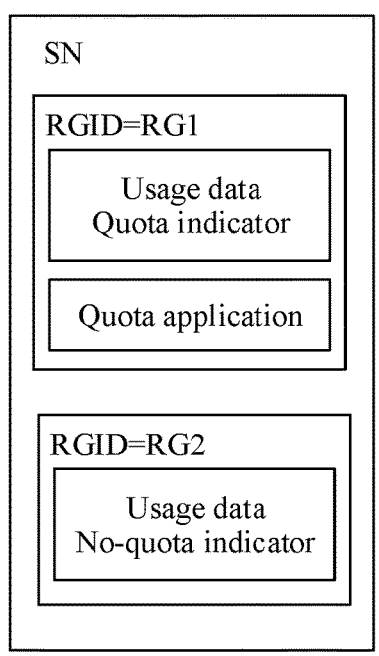
FIG. 2A is a first schematic diagram of composition and a source of a first charging request message according to an embodiment of this application.
Figure 2A:
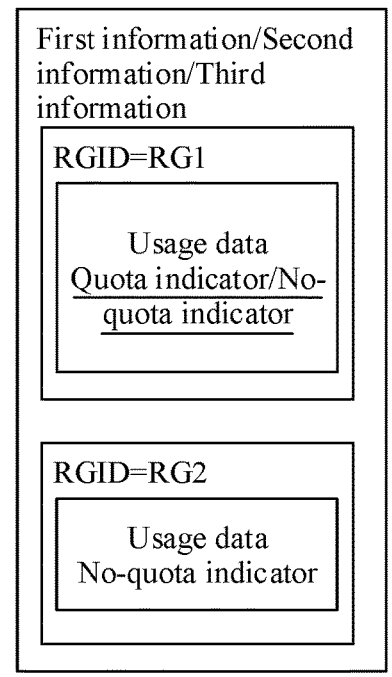

FIG. 2A is a first schematic diagram of composition and a source of a first charging request message according to an embodiment of this application. This schematic diagram shows one type of composition and one type of generation source of the first charging request message.

As shown in FIG. 2A, a charging trigger device may obtain the first charging request message based on a second charging request message. Specifically, the charging trigger device may generate the first charging request message based on the second charging request message. For example, the charging trigger device generates the first charging request message, and adds usage data (excluding a service unit quota request) in the second charging request message or usage data and a quota request in the second charging request message to the generated first charging request message as first charging data. The charging trigger device may alternatively modify the second charging request message to obtain the first charging request message. For example, the charging trigger device may modify charging data in the second charging request message to serve as first charging data. For example, the charging trigger device modifies a quota indicator of usage data in the second charging request message into a no-quota indicator, or deletes a service unit quota request in the second charging request message.

In addition, the charging trigger device may alternatively add first information, second information, and third information to the first charging request message.

The first information may be a "ReportReason" field, and a value of the field may be "Charging Function Device Resume". A manner of adding the field to the first charging request message is not limited. For example, the field may be used as a message-level field in the first charging request message, or the field may be used as a field in first charging data in the first charging request message. Regardless of a manner of adding the field, it may indicate that a reason for reporting the first charging request message is that a charging processing device for the user service transitioned to "available". It should be understood that a name and a value of the field herein are merely examples, and constitute no limitation.

The second information may be an explicit indicator, which directly or explicitly indicates that the first charging request message includes the first charging data, for example, may be an "exception indicator" or a "cache indicator". Alternatively, the second information may be implicit information, which indirectly or implicitly indicates that the first charging request message includes the first charging data. For example, assuming that the first charging request message is a charging resource creation request message and is used to create a new charging resource, but the first charging data is related to a charging resource created before the charging processing device is unavailable, the second information may include a charging resource identifier created before the charging processing device is unavailable. Alternatively, the second information may be a combination of the explicit indicator described above and the implicit information described above. It should be understood that a name of the explicit indicator herein is merely an example, and constitutes no limitation.

The third information may include a charging resource identifier corresponding to the user service and a serial number (SN) of the second charging request message, and the serial number of the second charging request message is a serial number assigned by the charging trigger device to the second charging request message. A manner in which the first charging request message carries the serial number of the second charging request message is not limited. A dedicated field such as a "DueSN" field may be set in the first charging request message, and is used to carry the serial number of the second charging request message. Alternatively, a dedicated field may not be set, but the serial number of the second charging request message is assigned to a serial number field of the first charging request message. Optionally, the third information may further include a retransmission indicator, for example, a "ReSend" or "Retry" indicator, which is used to indicate that the first charging data included in the first charging request message is retransmitted charging data. A manner in which the first charging request message carries the retransmission indicator is not limited. The retransmission indicator may be carried in the first charging request message, or may be carried in the first charging data. The available charging processing device may check whether charging processing has been performed on the first charging data in the first charging request message that carries the retransmission indicator.

When the first charging data is included, the first information, the second information, and the third information are all optional in the first charging request message, but including any combination of these pieces of information may further improve efficiency of the charging processing device and reduce a possibility of a charging error.

In an example of a 5G data connection service, the first charging data may include usage data (for example, traffic obtained through statistics collection) corresponding to a rating group (Rating Group, RG, that is, a group of service data flows with a same rating type). If the second charging request message and the first charging request message are charging resource update request messages or charging resource deletion request messages, the second charging request message and the first charging request message each further include a charging resource identifier, and the resource identifier is used to identify a charging resource created by the charging processing device. Therefore, the charging processing device can locate a corresponding charging resource based on the resource identifier for charging processing.

Figure 2B:
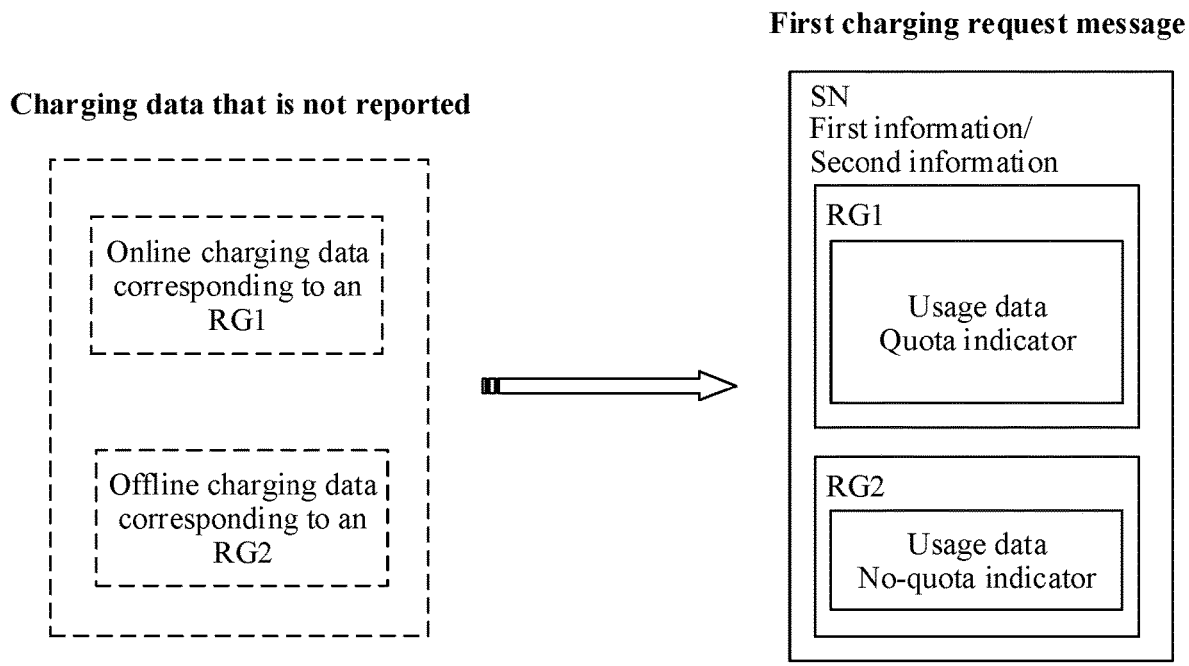
FIG. 2B is a second schematic diagram of composition and a source of a first charging request message according to an embodiment of this application.

FIG. 2B is a second schematic diagram of composition and a source of a first charging request message according to an embodiment of this application. This schematic diagram shows another type of composition and another type of generation source of the first charging request message.

As shown in FIG. 2B, the charging trigger device may generate the first charging request message based on obtained usage data of the user service. The obtained usage data may be online charging data obtained by performing an online charging operation, or may be offline charging data obtained by performing an offline charging operation, and is the charging data that is not sent described above. Specifically, the charging trigger device generates the first charging request message, and adds the obtained usage data to the generated first charging request message as first charging data. In addition, the charging trigger device may alternatively add first information and second information to the first charging request message. For details, refer to the embodiment corresponding to FIG. 2A.

Figure 3:
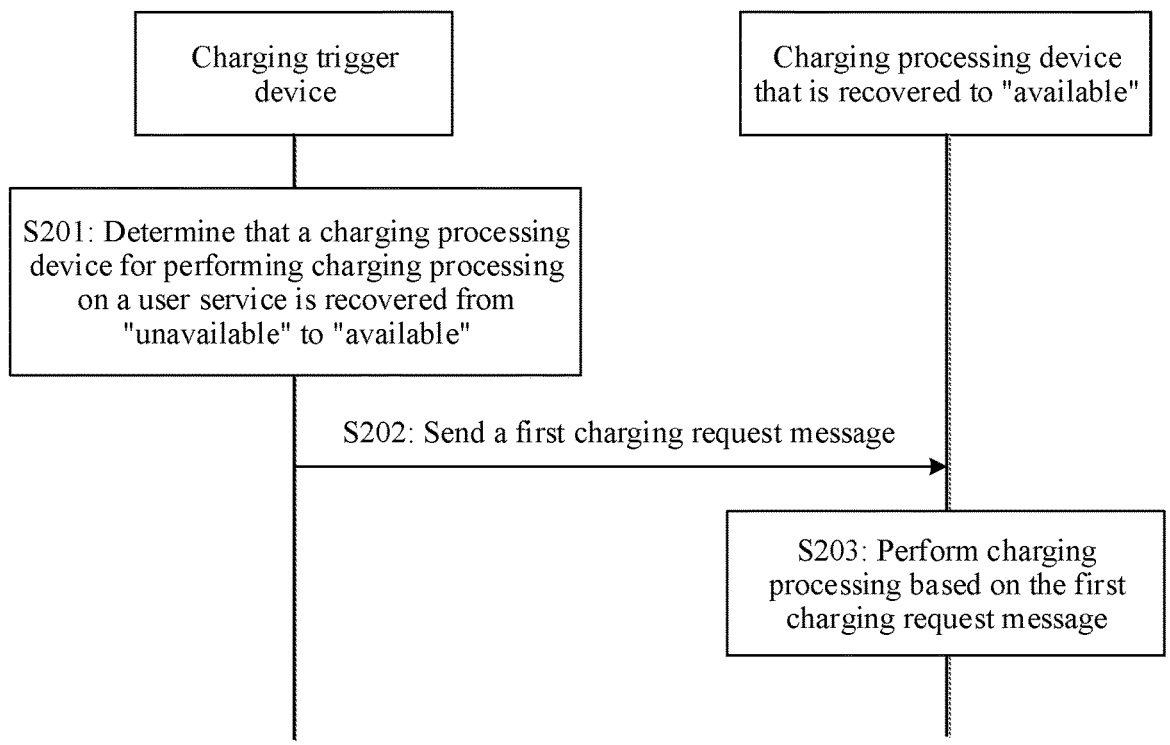
FIG. 3 is a flowchart of a method for interaction between a charging trigger device and a charging processing device according to an embodiment of this application.

FIG. 3 is a flowchart of a method for interaction between a charging trigger device and a charging processing device according to an embodiment of this application. The method procedure is implemented based on the architecture shown in FIG. 1. The charging trigger device corresponds to the charging trigger device 102 in FIG. 1. The available charging processing device corresponds to the charging processing device 101 in FIG. 1. In the method procedure, after a charging processing device transitioned to "available", the charging trigger device sends a first charging request message to the available charging processing device, so that the available charging processing device performs charging processing. The method procedure specifically includes the following steps.

Step 201: The charging trigger device determines that a charging processing device for a user service transitioned from "unavailable" to "available".

The charging trigger device has determined that the charging processing device for the user service may be in an unavailable state due to a connection fault or a fault of the charging processing device, and then determines that a charging processing device for the user service transitioned to "available". There are a plurality of specific determining manners. For example, the charging trigger device may periodically send a message to the charging processing device to detect a status of the charging processing device, or the charging processing device notifies the charging trigger device after a status of the charging processing device is normal (for a case in which the charging processing device is faulty).

Step 202: The charging trigger device sends a first charging request message to the available charging processing device.

After determining that a charging processing device transitioned to "available", the charging trigger device may send the first charging request message to the available charging processing device. Specifically, a trigger condition for triggering sending of the first charging request message may be determining that a charging processing device for the user service transitioned from "unavailable" to "available". Alternatively, a trigger condition for triggering sending of the first charging request message may be a first charging reporting condition of the user service after it is determined that a charging processing device for the user service transitioned from "unavailable" to "available". For example, a first reporting condition of a 5G data connection service may be a location update, a network handover, or a reporting interval reaching a preset value.

Figure 5A:
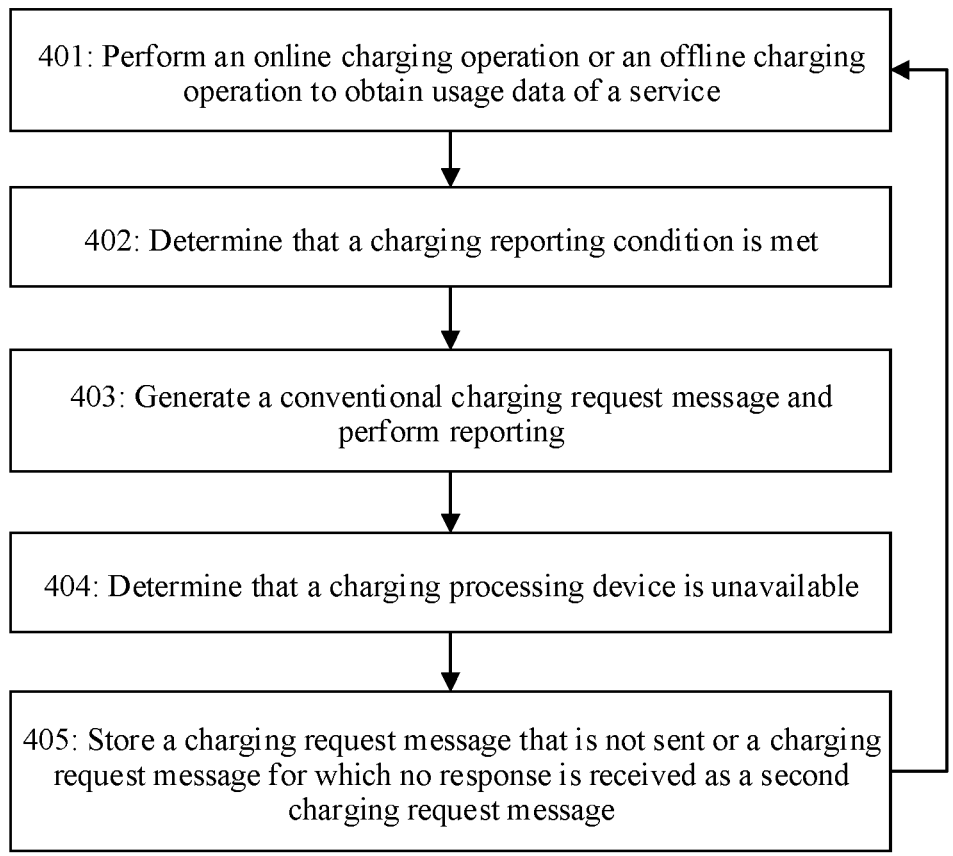
FIG. 5A is a flowchart of a first method for processing first charging data by a charging trigger device according to an embodiment of this application.
Figure 5B:
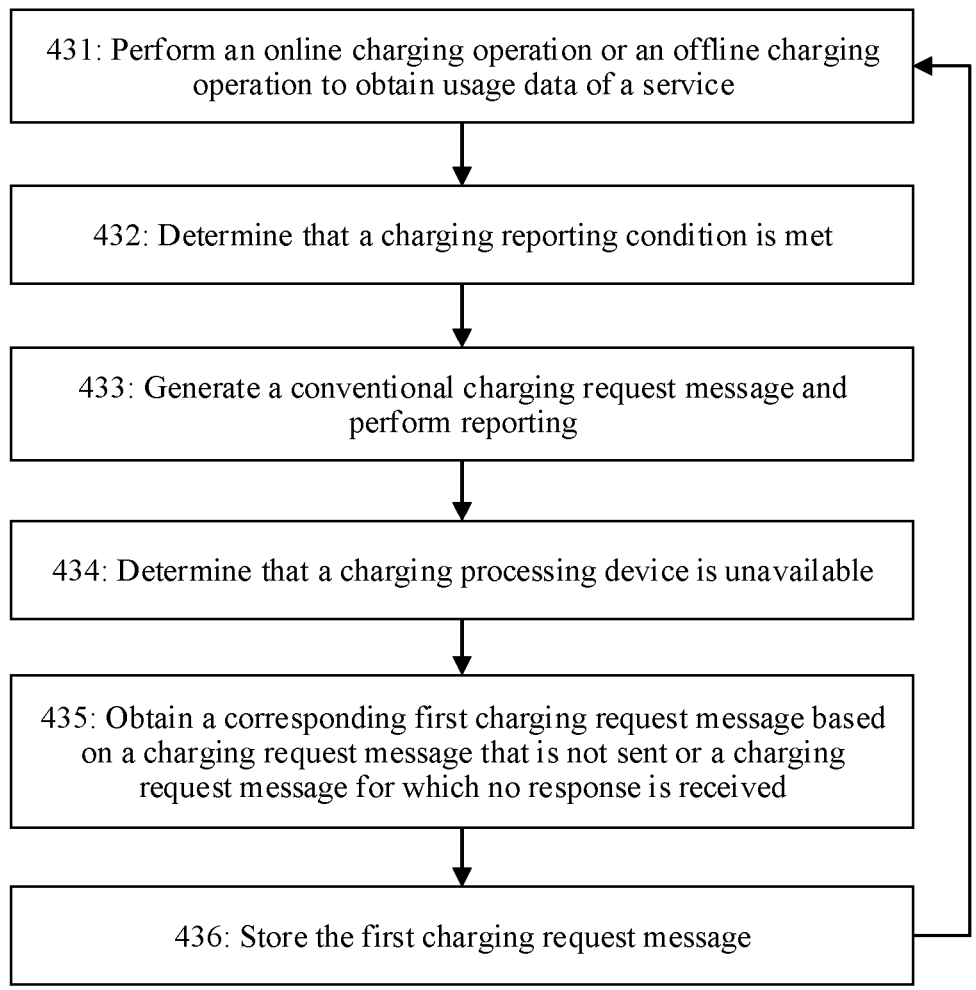
FIG. 5B is a flowchart of a second method for processing first charging data by a charging trigger device according to an embodiment of this application.
Figure 5C:
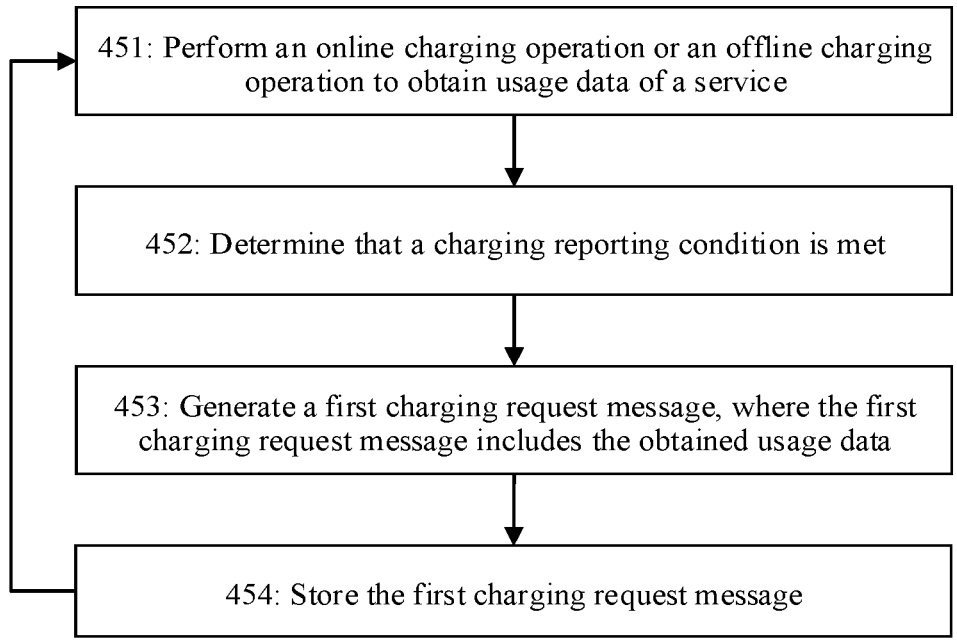
FIG. 5C is a flowchart of a third method for processing first charging data by a charging trigger device according to an embodiment of this application.

For a method for obtaining the first charging request message by the charging trigger device, refer to the embodiment corresponding to FIG. 2A, embodiments corresponding to FIG. 5A to FIG. 5C, and the like.

The first charging request message may be a charging resource creation request message, a charging resource update request message, or a charging resource deletion request message. If a charging resource corresponding to the user service is not successfully created before the charging trigger device determines that the charging processing device is unavailable, the first charging request message is a charging resource creation request message. If a charging resource corresponding to the user service has been successfully created before the charging trigger device determines that the charging processing device is unavailable, the first charging request message is a charging resource update request message or a charging resource deletion request message. If the charging trigger device stores an identifier of a charging resource that corresponds to the user service and that has been successfully created, the first charging request message (which is a charging resource update request message or a charging resource deletion request message) sent to the available charging processing device includes the identifier of the charging resource.

Step 203: The available charging processing device performs charging processing based on the first charging request message.

Specifically, the available charging processing device receives the first charging request message, and the first charging request message includes first charging data and/or first information. The available charging processing device performs charging processing on the user service based on the first charging request message, for example, writes usage data into an offline charging data record, deducts usage from usage data, or releases a corresponding service unit quota.

For a process in which the available charging processing device performs charging processing based on the first charging request message, refer to subsequent embodiments of this application.

Optionally, before sending the first charging request message to the available charging processing device the charging trigger device may further obtain a fault processing policy, and sends, based on the fault processing policy after determining that a charging processing device for the user service transitioned from "unavailable" to "available", the first charging request message for the user service to the available charging processing device. Optionally, the policy may further indicate a time for which the charging trigger device can store charging data or an amount of charging data that can be stored in the charging trigger device before a charging processing device for the user service transitioned from "unavailable" to "available". The obtaining a fault processing policy includes:

reading the fault processing policy from local configuration information; or receiving the fault processing policy from the charging processing device; or receiving the fault processing policy from a policy control function (Policy Control Function, PCF) device.

In this way, an operator may configure or set the fault processing policy on the charging trigger device, the charging processing device, or the PCF device, to control an operation that needs to be performed by the charging trigger device after the charging processing device for the user service is unavailable.

In the embodiment corresponding to FIG. 3, the charging trigger device may record or store charging data (that is, charging data that is not sent or charging data that is not processed) when the charging processing device for the user service is unavailable, and send, after determining that a charging processing device for the user service transitioned to "available", the first charging request message obtained based on the recorded charging data to the available charging processing device, so that the available charging processing device can perform charging processing on the service. In this way, interruption of the user service can be avoided, and missing charging or incorrect charging can be avoided, thereby avoiding a loss caused for the operator.

Figure 4A:
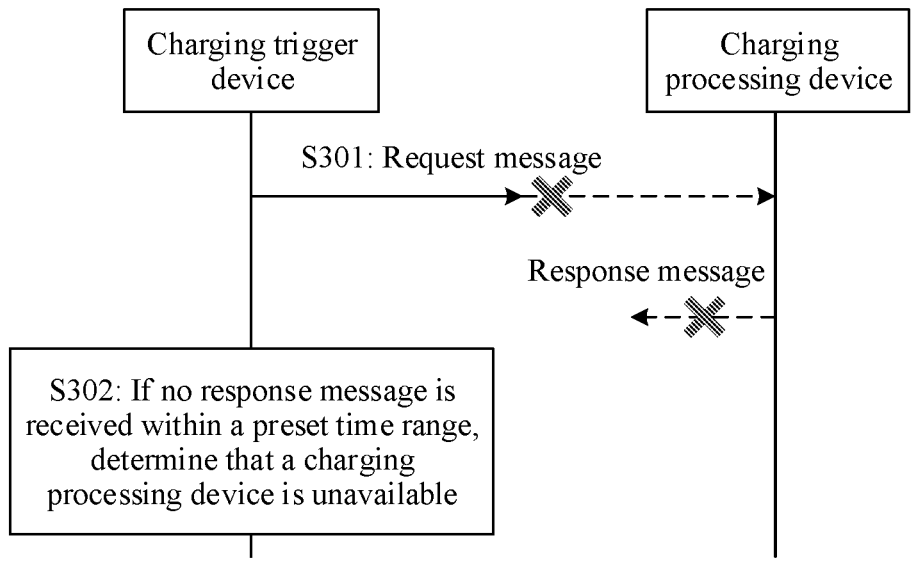
FIG. 4A is a flowchart of a method for determining that a charging processing device is unavailable according to an embodiment of this application.

FIG. 4A is a flowchart of a method for determining that a charging processing device is unavailable according to an embodiment of this application. The method procedure is implemented based on the architecture shown in FIG. 1. A charging trigger device corresponds to the charging trigger device 102 in FIG. 1. The charging processing device corresponds to the charging processing device 101 in FIG. 1. The method procedure describes how the charging trigger device determines that the charging processing device is unavailable, and specifically includes the following steps.

Step 301: The charging trigger device sends a request message to the charging processing device.

The request message may be a system-level request message (for example, a heartbeat message or a probe message), or may be a charging request message for a user service (for example, the charging resource creation request message, the charging resource update request message, or the charging resource deletion request message described above).

Optionally, if the request message is a charging request message for a user service, the charging trigger device first determines, based on system configuration information, that the charging processing device is configured to perform charging processing on the user service, and then sends the charging request message to the charging processing device.

Step 302: If the charging trigger device does not receive a response message within a preset time range, the charging trigger device determines that the charging processing device is unavailable.

Specifically, after sending the request message, the charging trigger device waits for the charging processing device to return a corresponding response message. If the charging trigger device does not receive a corresponding response message within the preset time range, the charging trigger device sets a state of the charging processing device to "unavailable" or determines that the charging processing device enters an "unavailable" state.

A reason why the charging trigger device does not receive the response message within the preset time range includes but is not limited to the following: A network between the charging trigger device and the charging processing device is faulty, and consequently the request message fails to be sent or the response message fails to be sent. Alternatively, a network between the charging trigger device and the charging processing device is normal, but the charging processing device is faulty and cannot return the corresponding response message to the charging trigger device within the preset time range.

After determining that a charging processing device is unavailable, the charging trigger device may further perform one or more of the following operations. For a specific process, refer to subsequent embodiments of this application (for example, embodiments corresponding to FIG. 5A to FIG. 5D).

(1) The charging trigger device stores a charging request message that is not sent successfully (that is, the second charging request message described above), or directly generates a first charging request message based on the second charging request message and stores the generated first charging request message.

(2) When the charging processing device is unavailable, the charging trigger device allows the service and performs a charging operation normally. If a charging method of the user service is configured as online charging, the charging trigger device grants a virtual quota, and performs an online charging operation (for example, quota management and usage data collection), to collect usage data of the user service. The virtual quota is a quota virtually granted by the charging trigger device locally, and the quota is not actually granted on the charging processing device. If the charging method of the user service is configured as offline charging, the charging trigger device directly collects usage data of the service without controlling the user service based on a quota.

When the charging processing device for the user service is unavailable, if a reporting condition of an immediate reporting type of the user service is met, the charging trigger device performs processing according to a reporting condition of a delayed reporting type. To be specific, when the reporting condition is met, the charging trigger device does not immediately perform an action of reporting to the charging processing device, but stores usage data locally before the reporting condition occurs, and then collects usage data after the reporting condition occurs. After a charging processing device transitioned to "available", the charging trigger device generates and reports a first charging request message, where the first charging request message includes the collected usage data. Alternatively, when the charging processing device is unavailable, if a reporting condition of an immediate reporting type of the user service is met, the charging trigger device directly generates a first charging request message based on usage data before the reporting condition occurs, and stores the first charging request message locally. After a charging processing device transitioned to "available", the charging trigger device reports the first charging request message.

(3) When the charging processing device is unavailable, the charging trigger device allows the user service and performs an offline charging operation normally. To be specific, if a charging method of the user service is configured as offline charging, the charging trigger device performs the offline charging operation to collect usage data of the user service. If the charging method of the user service is configured as online charging, the charging trigger device performs switching to offline charging, and performs the offline charging operation, to collect usage data of the user service. It should be understood that, if the charging method of the user service is configured as online charging, the switching to offline charging herein may be a temporary operation, and switching to online charging is performed after a charging processing device transitioned to "available".

Figure 4B:
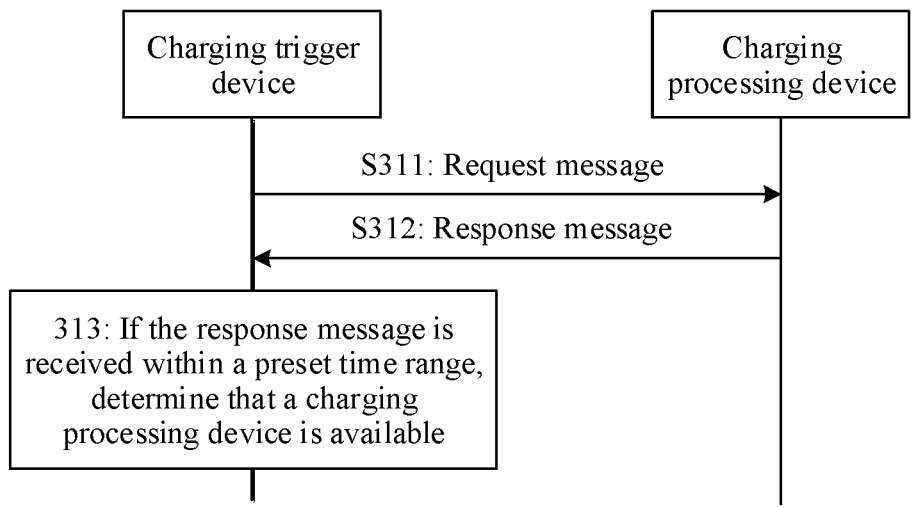
FIG. 4B is a flowchart of a method for determining that a charging processing device is available according to an embodiment of this application.

FIG. 4B is a flowchart of a method for determining that a charging processing device is available according to an embodiment of this application. The method procedure is implemented based on the architecture shown in FIG. 1. A charging trigger device corresponds to the charging trigger device 102 in FIG. 1. The charging processing device corresponds to the charging processing device 101 in FIG. 1. The method procedure describes how the charging trigger device determines that the charging processing device is available, and specifically includes the following steps.

Step 311: The charging trigger device sends a request message to the charging processing device.

This step is similar to step 301, and details are not described again.

Step 312: The charging processing device returns a response message to the charging trigger device.

After receiving the request message, the charging processing device performs corresponding processing, and returns a corresponding response message within a preset time range. For example, if the request message is a charging request message, the charging processing device performs corresponding charging processing based on charging data in the request message, and then returns a charging response message to the charging trigger device within the preset time range. The charging response message includes a charging processing result.

Step 313: If the charging trigger device receives the response message within the preset time range, the charging trigger device determines that a charging processing device transitioned to "available".

Because the charging trigger device receives the corresponding response message within the preset time range, the charging trigger device sets a state of a charging processing device to "available" or determines that a charging processing device enters an "available" state.

After determining that a charging processing device transitioned from "unavailable" to "available", the charging trigger device may send the first charging request message described above to the available charging processing device, so that the charging processing device performs charging processing.

Optionally, the charging trigger device may start a charging processing device status maintenance process to perform the methods in FIG. 4A and FIG. 4B, so as to maintain a status of the charging processing device.

FIG. 5A is a flowchart of a first method for processing first charging data by a charging trigger device according to an embodiment of this application. The method procedure is implemented based on the architecture shown in FIG. 1. The charging trigger device corresponds to the charging trigger device 102 in FIG. 1. A available charging processing device corresponds to the charging processing device 101 in FIG. 1 or an alternative device (not listed in the figure) of the charging processing device 101. In the method, the charging trigger device stores a charging request message that is not sent or a charging request message for which no response is received as a second charging request message. The method includes the following steps.

Step 401: The charging trigger device performs an online charging operation or an offline charging operation to obtain usage data of a user service.

Specifically, the online charging operation specifically includes: The charging trigger device applies to a charging processing device for a quota of the user service, manages use of the quota granted by the charging processing device, and collects charging data of the user service. The offline charging operation specifically includes: The charging trigger device directly collects or makes statistics on usage data of the user service without controlling the user service based on a quota.

Step 402: The charging trigger device determines that a charging reporting condition is met.

Specifically, the charging trigger device determines that the charging reporting condition of the user service is met. For example, a quota is used up, a quota expires, a network accessed by a user is switched, or a user location is updated.

Step 403: The charging trigger device generates a conventional charging request message and performs reporting.

Specifically, the charging trigger device generates the conventional charging request message based on the collected usage data, and sends the conventional charging request message to the charging processing device.

Optionally, if the charging trigger device sets a state of the charging processing device to "unavailable", the charging trigger device may determine that a charging processing device for the user service is unavailable, and may not send the conventional charging request message to the charging processing device. In this case, the conventional charging request message is a charging request message that is not sent, and step 405 is performed.

Step 404: The charging trigger device determines that the charging processing device is unavailable.

Specifically, if the charging trigger device does not receive, within a preset time range, a response message of the conventional charging request message sent in step 403, the charging trigger device may determine that a charging processing device is unavailable. In this case, the conventional charging request message is a charging request message for which no response is received.

Step 405: The charging trigger device stores a charging request message that is not sent or a charging request message for which no response is received as a second charging request message.

Specifically, the charging trigger device stores the charging request message that is not sent in step 403 or the charging request message for which no response is received in step 404 as the second charging request message, for example, stores the second charging request message in a first queue.

Optionally, after the charging trigger device determines that the charging processing device for the service is unavailable, if a charging mode of the service is online charging, the charging trigger device performs an offline charging operation on the service, or grants a virtual quota to the service.

It should be understood that an object of the charging mode, an object of the offline charging operation, and an object to which the virtual quota is granted may vary with a service requirement or scenario. For example, for a data connection service, "the charging mode of the user service" may be "a charging mode of a service data flow corresponding to usage data in the second charging request message", or may be "a charging mode of an entire PDU session in the second charging request message"; "performing the offline charging operation on the user service" may be "performing an offline charging operation on a service data flow corresponding to usage data in the second charging request message", or may be "performing an offline charging operation on an entire PDU session in the second charging request message"; and "granting the virtual quota to the user service" may be "granting a virtual quota to a service data flow corresponding to usage data in the second charging request message", or may be "granting a virtual quota to an entire PDU session in the second charging request message". Details are not described subsequently in the embodiments of this application.

Optionally, the charging trigger device may determine the charging mode of the user service based on local preconfigured data or externally obtained configuration data. For example, for a data connection service, the charging mode of the user service may be determined based on preconfigured data on an SMF device or a policy delivered by a PCF device. The method is applicable to other embodiments of this application, and details are not described.

According to the method procedure corresponding to FIG. 5A, the charging trigger device may store the second charging request message when the charging processing device for the user service is unavailable. In this way, after the charging trigger device subsequently determines that a charging processing device for the user service transitioned from "unavailable" to "available", the charging trigger device may obtain a first charging request message based on the stored second charging request message, and send the first charging request message to the available charging processing device. For details, refer to other embodiments of this application.

FIG. 5B is a flowchart of a second method for processing first charging data by a charging trigger device according to an embodiment of this application. The method procedure is implemented based on the architecture shown in FIG. 1. The charging trigger device corresponds to the charging trigger device 102 in FIG. 1. An available charging processing device corresponds to the charging processing device 101 in FIG. 1 or an alternative device (not listed in the figure) of the charging processing device 101. In the method, when a charging processing device for a user service is unavailable, the charging trigger device generates and stores a first charging request message based on a second charging request message. The method includes the following steps.

Step 431 to step 434 are similar to step 401 to step 404, and details are not described herein again.

Step 435: The charging trigger device obtains a corresponding first charging request message based on a charging request message that is not sent or a charging request message for which no response is received.

Specifically, because the charging request message in step 433 is not successfully sent, the charging request message is a charging request message for which no response is received, and is the second charging request message described above. The charging trigger device obtains the corresponding first charging request message based on the second charging request message.

Specifically, if the second charging request message includes the usage data of the user service and a corresponding quota indicator, the charging trigger device may add the usage data to first charging data in the obtained first charging request message, where the first charging data indicates that the usage data is usage data with a quota, or the charging trigger device may add the usage data to first charging data in the obtained first charging request message, where the first charging data indicates that the usage data is usage data without a quota. The usage data with a quota is usage data corresponding to an available service unit quota, and the usage data without a quota is usage data corresponding to an unavailable service unit quota. The available service unit quota is a service unit quota that is received from the charging processing device and that is still valid.

If the second charging request message includes the usage data of the user service and a corresponding no-quota indicator, the charging trigger device may add the usage data to first charging data in the obtained first charging request message, where the first charging data indicates that the usage data is usage data without a quota.

Specifically, the charging trigger device may use a quota indicator parameter in the first charging request message or the first charging data, where the first charging data indicates that the usage data is usage data with a quota or usage data without a quota. For example, if the first charging data includes a quota indicator, it indicates that the usage data is usage data with a quota, or if the first charging data includes a no-quota indicator, it indicates that the usage data is usage data without a quota. If the first charging request message or the first charging data carries no quota indicator parameter, it is considered by default that the usage data is usage data without a quota. In another possible implementation, if the first charging request message or the first charging data carries no quota indicator parameter, it may be considered by default that the usage data is usage data with a quota.

Optionally, the first charging request message may further include third information. For a charging resource creation message, the third information may be unique identification information of the user service. For example, if the user service is a 5G data connection service, the unique identification information of the user service may be a combination of a user identifier and a PDU session identifier, or a combination of a user identifier, a PDU session identifier, and an SMF identifier. For a charging resource update/deletion message, the third information may be a combination of a charging resource identifier and a serial number. To relieve load of the charging processing device, the third message may further include a retransmission indicator, so that the charging processing device performs retransmission determining only on first charging data that carries a retransmission indicator.

For more methods for obtaining the corresponding first charging request message based on the second charging request message, refer to the embodiment corresponding to FIG. 2A.

Optionally, after the charging trigger device determines that a charging processing device for the user service is unavailable, if a charging mode of the user service is online charging, the charging trigger device performs an offline charging operation on the user service, or grants a virtual quota to the user service. The virtual quota is a quota virtually granted by the charging trigger device locally.

For an object of the charging mode, an object of the offline charging operation, an object to which the virtual quota is granted, and a concept of the virtual quota, refer to descriptions in the method procedure in FIG. 5A.

Step 436: The charging trigger device stores the first charging request message.

Specifically, the charging trigger device stores the first charging request message obtained in step 435, for example, stores the first charging request message in a second queue. Subsequently, if the user service continues to be run, the procedure may proceed to step 401.

According to the method procedure corresponding to FIG. 5B, the charging trigger device may obtain the corresponding first charging request message based on the second charging request message when the charging processing device for the user service is unavailable. In this way, after the charging trigger device subsequently determines that a charging processing device for the user service transitioned from "unavailable" to "available", the charging trigger device may send the stored first charging request message to the available charging processing device. For details, refer to other embodiments of this application.

FIG. 5C is a flowchart of a third method for processing first charging data by a charging trigger device according to an embodiment of this application. The method procedure is implemented based on the architecture shown in FIG. 1. The charging trigger device corresponds to the charging trigger device 102 in FIG. 1. An available charging processing device corresponds to the charging processing device 101 in FIG. 1 or an alternative device (not listed in the figure) of the charging processing device 101. In the method, when a charging processing device for a user service is unavailable, the charging trigger device generates and stores a first charging request message based on collected charging data. The method includes the following steps.

Step 451: The charging trigger device performs an online charging operation or an offline charging operation to obtain usage data of a user service.

The online charging operation includes: The charging trigger device applies to the charging processing device for a quota of the user service, manages use of the quota granted by the charging processing device, and obtains charging data of the service. The offline charging operation includes: The charging trigger device collects charging data of the service.

Specifically, when the charging processing device is unavailable, the charging trigger device may further perform the online charging operation or the offline charging operation according to one of the following methods:

Method (1): If a charging method of the user service is configured as online charging, the charging trigger device grants a virtual quota to the user service, and performs an online charging operation (for example, quota management and usage data collection) based on the virtual quota, to obtain the usage data (referred to as online usage data) of the service. If the charging method of the user service is configured as offline charging, the charging trigger device directly obtains the usage data (referred to as offline usage data) of the service.

Method (2): If a charging method of the user service is configured as offline charging, the charging trigger device performs an offline charging operation to obtain the usage data (referred to as offline usage data) of the service. If the charging method of the user service is configured as online charging, switching to offline charging is performed, and the charging trigger device performs an offline charging operation to obtain the usage data (referred to as online-to-offline usage data) of the service. It should be understood that, if the charging method of the service is configured as online charging, the switching to offline charging herein may be a temporary operation, and switching to online charging is performed after a charging processing device transitioned to "available".

Step 452: The charging trigger device determines that a charging reporting condition is met.

Specifically, the charging trigger device determines that the charging reporting condition of the user service is met. For example, a location of user equipment is changed, or an accessed network is switched. The charging reporting condition herein is a charging reporting condition of an immediate reporting type. However, the charging trigger device does not immediately perform an action of reporting to the charging processing device, but generates and stores a first charging request message based on the obtained usage data. For details, refer to steps 453 and 454.

Step 453: The charging trigger device generates a first charging request message, where the first charging request message includes the obtained usage data.

Specifically, when the charging processing device for the user service is unavailable, the charging trigger device generates the first charging request message according to one of the following methods:

(1) If a charging mode of the user service is offline charging, first charging data in the generated (or obtained) first charging request message includes the offline usage data obtained in the method (1) and the method (2) in step 451, and the first charging data indicates that the usage data is usage data without a quota. For example, the first charging data includes a no-quota indicator or includes neither a quota indicator nor a no-quota indicator, to indicate that the usage data is usage data without a quota.

(2) If a charging mode of the user service is online charging, first charging data in the generated (or obtained) first charging request message includes the online usage data obtained in the method (1) in step 451, and the first charging data indicates that the usage data is usage data with a quota. The usage data with a quota herein is a service unit quota that is received from the charging processing device and that is still valid, or a virtual quota granted by the charging trigger device. For example, the first charging data includes a quota indicator. Alternatively, first charging data in the generated (or obtained) first charging request message includes the online-to-offline usage data obtained in the method (2) in step 451, and the first charging data indicates that the usage data is usage data without a quota.

For a method in which the first charging data indicates whether the usage data is usage data with a quota or usage data without a quota, refer to the description in step 435.

For more methods for obtaining the first charging request message, refer to the embodiment corresponding to FIG. 2B.

Step 454: The charging trigger device stores the first charging request message.

Specifically, the charging trigger device stores the first charging request message generated in step 453 or into which charging data is written, for example, stores the first charging request message in a third queue. Subsequently, if the user service continues to be run, the procedure may proceed to step 451.

According to the method procedure corresponding to FIG. 5C, the charging trigger device may generate and store the first charging request message based on the collected charging data when the charging processing device for the user service is unavailable. In this way, after the charging trigger device subsequently determines that a charging processing device for the user service transitioned from "unavailable" to "available", the charging trigger device may send the stored first charging request message to the available charging processing device. For details, refer to other embodiments of this application.

Figure 5D:
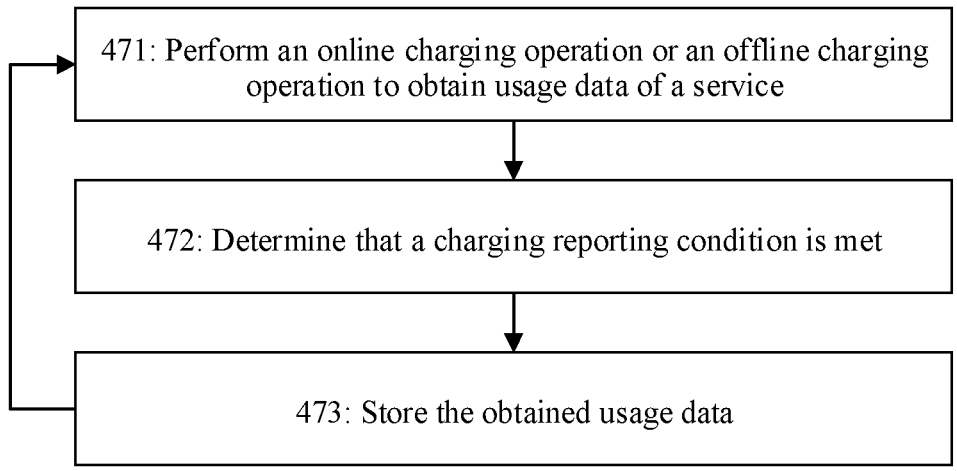
FIG. 5D is a flowchart of a fourth method for processing first charging data by a charging trigger device according to an embodiment of this application.

FIG. 5D is a flowchart of a fourth method for processing first charging data by a charging trigger device according to an embodiment of this application. The method procedure is implemented based on the architecture shown in FIG. 1. The charging trigger device corresponds to the charging trigger device 102 in FIG. 1. An available charging processing device corresponds to the charging processing device 101 in FIG. 1 or an alternative device (not listed in the figure) of the charging processing device 101. In the method, when a charging processing device for a user service is unavailable, the charging trigger device stores collected charging data (that is, charging data that is not sent), but does not generate a first charging request message. The method includes the following steps.

Step 471: The charging trigger device performs an online charging operation or an offline charging operation to obtain usage data of a user service.

This step is similar to step 451, and details are not described again.

Step 472: The charging trigger device determines that a charging reporting condition is met.

Specifically, the charging trigger device determines that the charging reporting condition of the user service is met. For example, a location of user equipment is changed, or an accessed network is switched. The charging reporting condition herein is a charging reporting condition of an immediate reporting type. However, the charging trigger device does not immediately perform an action of reporting to the charging processing device, but stores the obtained usage data. For details, refer to step 473.

Step 473: The charging trigger device stores the obtained charging data.

Specifically, when the reporting condition is met, the charging trigger device does not immediately perform an action of reporting to the charging processing device, but locally stores usage data before the reporting condition occurs, and then collects usage data after the reporting condition occurs. Specifically, the charging trigger device stores the usage data before the reporting condition occurs as charging data that is not sent, for example, stores the charging data that is not sent in a fourth queue.

Subsequently, if the service continues to be run, the procedure may proceed to step 471.

According to the method procedure corresponding to FIG. 5D, the charging trigger device may store the collected usage data when the charging processing device for the user service is unavailable. In this way, after the charging trigger device subsequently determines that a charging processing device for the user service transitioned from "unavailable" to "available", the charging trigger device may generate and report a first charging request message based on the stored usage data. For details, refer to other embodiments of this application.

It should be understood that a means of storing the charging data or the charging request message in FIG. 5A to FIG. 5D is not limited to a queue, and there may be another means, for example, a file. When the queue is used for storage, the first queue, the second queue, the third queue, and the fourth queue may be different queues, or may be a same queue.

Figure 5E:
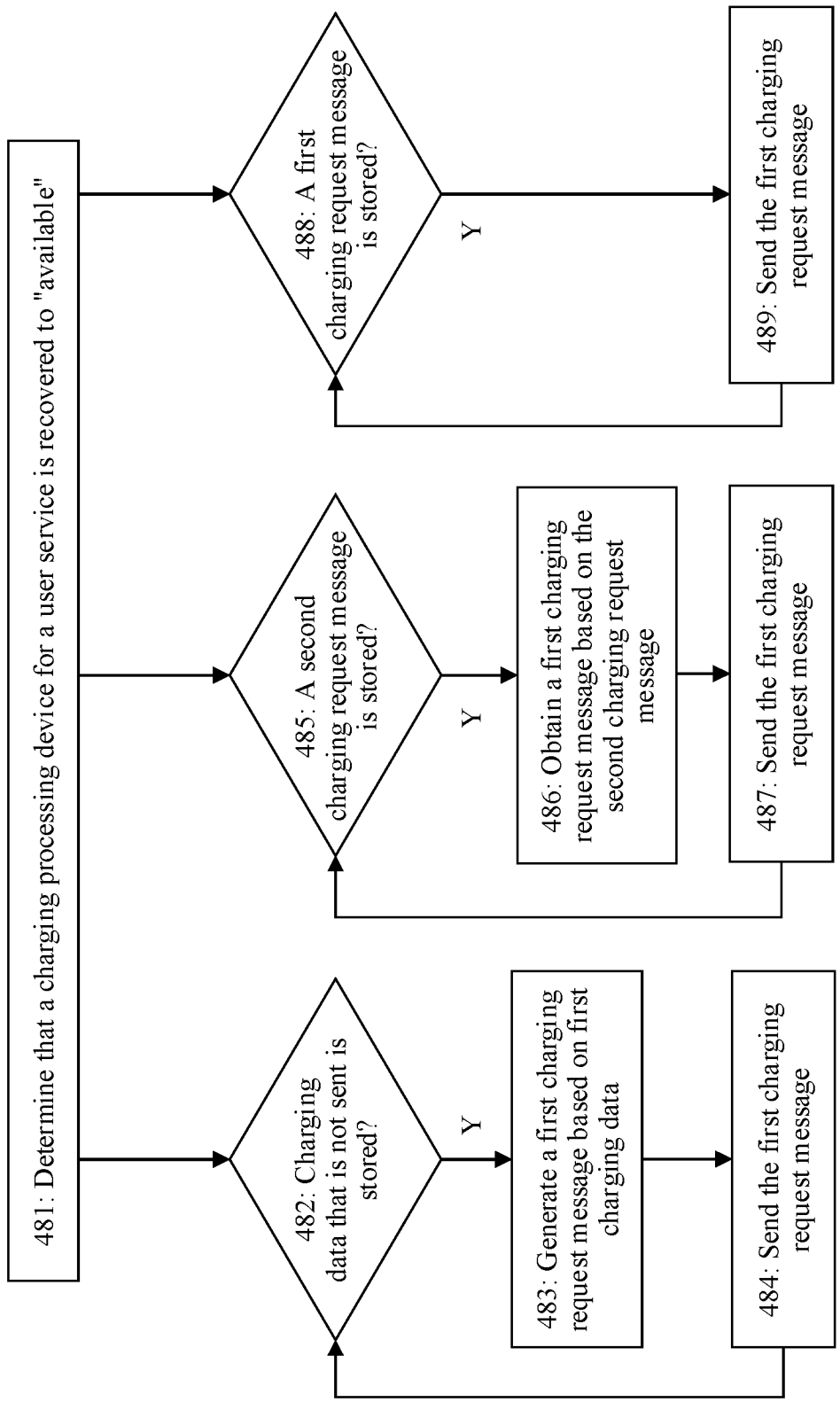
FIG. 5E is a flowchart of a method for sending a first charging request message by a charging trigger device according to an embodiment of this application.

FIG. 5E is a flowchart of a method for sending a first charging request message by a charging trigger device according to an embodiment of this application. The method procedure is implemented based on the architecture shown in FIG. 1. The charging trigger device corresponds to the charging trigger device 102 in FIG. 1. An available charging processing device corresponds to the charging processing device 101 in FIG. 1 or an alternative device (not listed in the figure) of the charging processing device 101. In the method, the charging trigger device sends, based on an execution result of any method procedure in FIG. 5A to FIG. 5D or an execution result of any combination of the method procedures in FIG. 5A to FIG. 5D, the first charging request message to the available charging processing device. The method includes the following steps.

Step 481: The charging trigger device determines that a charging processing device for a user service transitioned to "available".

For a specific method for determining, by the charging trigger device, that the charging processing device for the user service transitioned to "available", refer to the method procedures corresponding to FIG. 4A and FIG. 4B. Subsequently, the charging trigger device may perform processes of step 482 to 484, step 485 to 487, and step 488 and 489 in parallel. It should be understood that this is merely an optional implementation, and other time sequences may also be used for implementation, for example, these steps are performed in series.

Step 482: The charging trigger device determines whether charging data that is not sent is stored.

Specifically, the charging trigger device may determine whether a fourth queue stores the charging data that is not sent. If the fourth queue stores the charging data that is not sent, step 483 is performed, or if the fourth queue does not store the charging data that is not sent, the branch procedure ends.

Step 483: The charging trigger device generates a first charging request message based on the charging data that is not sent.

For a method for generating the first charging request message based on the charging data that is not sent, refer to the description in step 453. Details are not described again.

Step 484: The charging trigger device sends the first charging request message.

Specifically, the charging trigger device sends the first charging request message to the available charging processing device.

Then, the procedure proceeds to step 482.

Step 485: The charging trigger device determines whether a second charging request message is stored.

Specifically, the charging trigger device may determine whether a first queue stores the second charging request message. If the first queue stores the second charging request message, step 486 is performed, or if the first queue does not store the second charging request message, the branch procedure ends.

Step 486: The charging trigger device generates a first charging request message based on the second charging request message.

For a method for generating the first charging request message based on the second charging request message, refer to the description in step 435. Details are not described again.

Step 487: The charging trigger device sends the first charging request message.

This step is similar to step 484, and details are not described again.

Then, the procedure proceeds to step 485.

Step 488: The charging trigger device determines whether a first charging request message is stored.

Specifically, the charging trigger device may determine whether a second queue or a third queue stores the first charging request message. If the second queue or the third queue stores the first charging request message, step 489 is performed, or if the second queue or the third queue does not store the first charging request message, the branch procedure ends.

Step 489: The charging trigger device sends the first charging request message.

This step is similar to step 484, and details are not described again.

The method procedure in FIG. 5E may be combined with any one of the method procedures in FIG. 5A to FIG. 5D, or may be combined with any combination of the method procedures in FIG. 5A to FIG. 5D. Through the combination, when the charging processing device is unavailable, the charging data that is not sent or charging data that is not processed may be processed, and after a charging processing device for the user service transitioned to "available", the first charging request message may be sent to the available charging processing device, so that the available charging processing device can perform charging processing on the user service. Therefore, determining in step 482, step 485, and step 488 is not mandatory, and an execution sequence is not fixed. For example, only branches of step 482 and step 485 may be executed, or only branches of step 485 and step 488 may be executed. It should be noted that, although step 482, step 485, and step 488 are not performed in a specific sequence, first charging request messages may be generated in a specific sequence. For example, in step 484, step 487, and step 489, the first request messages may be sent according to serial numbers of the first request messages.

Figure 6A:
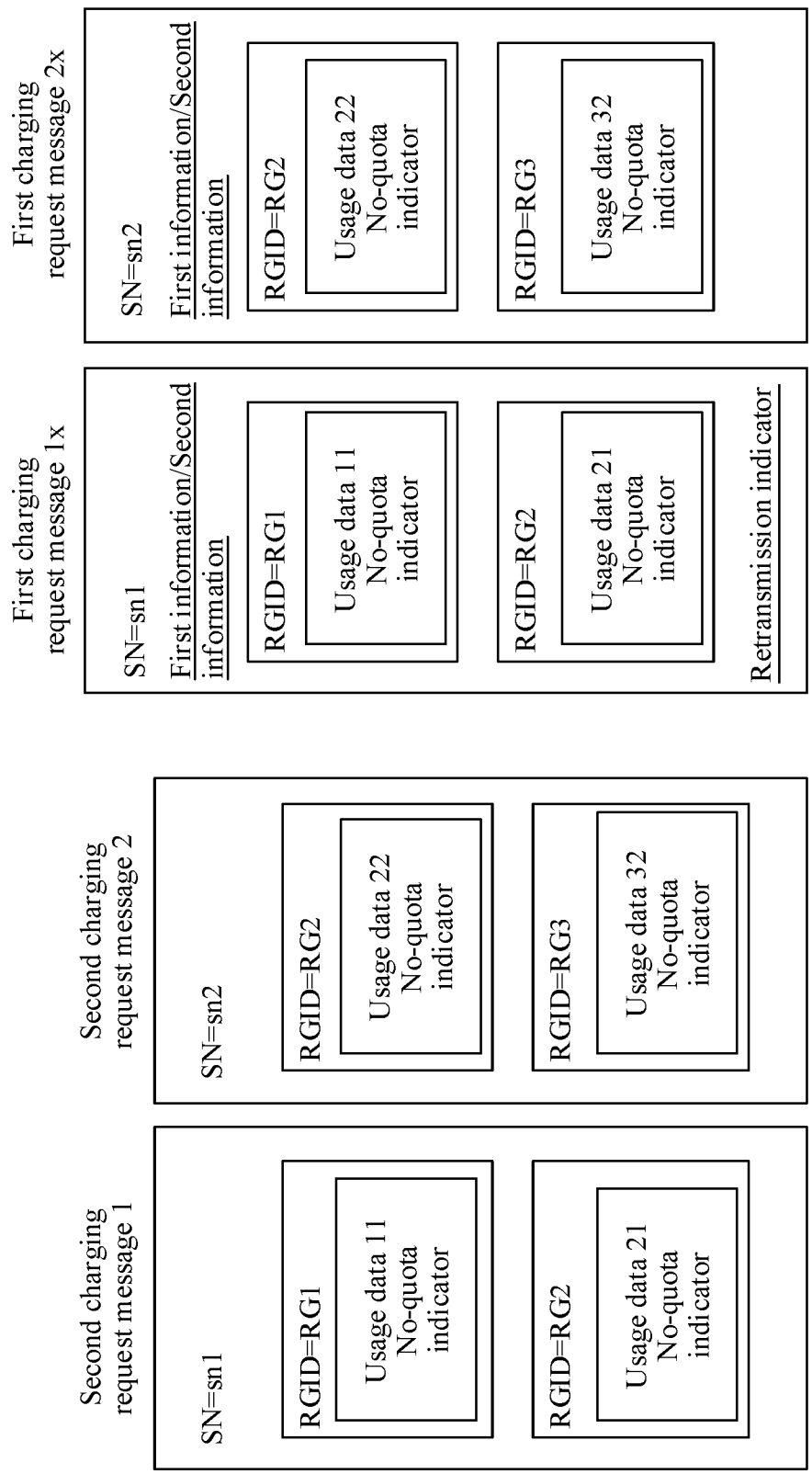
FIG. 6A is a third schematic diagram of composition and a source of a first charging request message according to an embodiment of this application.

FIG. 6A is a third schematic diagram of composition and a source of a first charging request message according to an embodiment of this application, and is used to describe the method for obtaining the first charging request message in the foregoing embodiments. A charging mode of a user service is offline charging, and a charging trigger device generates one corresponding first charging request message based on one second charging request message. Details are described as follows:

As shown in FIG. 6A, a second charging request message 1 and a second charging request message 2 are charging request messages that need to be sent to a charging processing device respectively at a moment t1 and a moment t2. However, because the charging processing device is unavailable, the second charging request message 1 and the second charging request message 2 are not sent to the charging processing device. Alternatively, although the charging trigger device has sent the second charging request message 1 and the second charging request message 2 to the charging processing device, the charging trigger device does not receive a corresponding response message. A serial number of the second charging request message 1 is sn1, which corresponds to the moment t1. The second charging request message 1 includes two pieces of usage data: usage data 11 corresponding to a rating group RG1 and usage data 21 corresponding to a rating group RG2. Because the charging mode of the user service is offline charging, the usage data 11 and the usage data 21 each carry a no-quota indicator, to indicate that the usage data 11 and the usage data 21 each are usage data without quota control. The second charging request message 2 is similar to the second charging request message 1, and details are not described again.

A process in which the charging trigger device obtains a first charging request message 1x based on the second charging request message 1 may be as follows: The charging trigger device creates the first charging request message 1x, and copies the usage data 11 corresponding to the rating group RG1 and the no-quota indicator in the second charging request message 1, and the usage data 21 corresponding to the rating group RG2 and the no-quota indicator in the second charging request message 1 into the first charging request message 1x. In addition, the charging trigger device may further add the first information and/or the second information described above to the first charging request message 1x. If the charging trigger device has sent the second charging request message 1 but does not receive a corresponding response message, the charging trigger device may further add a retransmission indicator to the first charging request message 1x, to indicate, to the available charging processing device, that "the charging trigger device has sent corresponding charging data to the available charging processing device, and the available charging processing device needs to check whether charging processing has been performed". In this way, the available charging processing device can be prevented from determining whether charging processing has been performed on all first charging request messages (but only needs to determine whether charging processing has been performed on a first charging request message that carries a retransmission indicator), thereby improving processing efficiency of the available charging processing device. The serial number sn1 of the second charging request message 1 may be used as a serial number of the first charging request message 1x, so that the available charging processing device can determine, based on the sn1 and a charging resource identifier, whether charging processing has been performed on first charging data in the first charging request message 1x. Alternatively, a process in which the charging trigger device obtains a first charging request message 1x based on the second charging request message 1 may be as follows: The charging trigger device directly inserts the first information, the second information, the retransmission indicator, and the like described above into the second charging request message 1, so that the second charging request message 1 becomes the first charging request message 1x. A process in which the charging trigger device obtains a first charging request message 2x based on the second charging request message 2 is similar to the foregoing process. A difference lies in that if the charging trigger device has not sent the second charging request message 2, the first charging request message 2x may carry no retransmission indicator.

It should be understood that, in FIG. 6A, the retransmission indicator, the charging resource identifier, and the serial number sn1 in the first charging request message 1x jointly constitute third information.

In FIG. 6A, the method for obtaining one corresponding first charging request message based on one second charging request message helps ensure a sending sequence of the first charging request message, and avoid a charging error during charging processing.

Figure 6B:
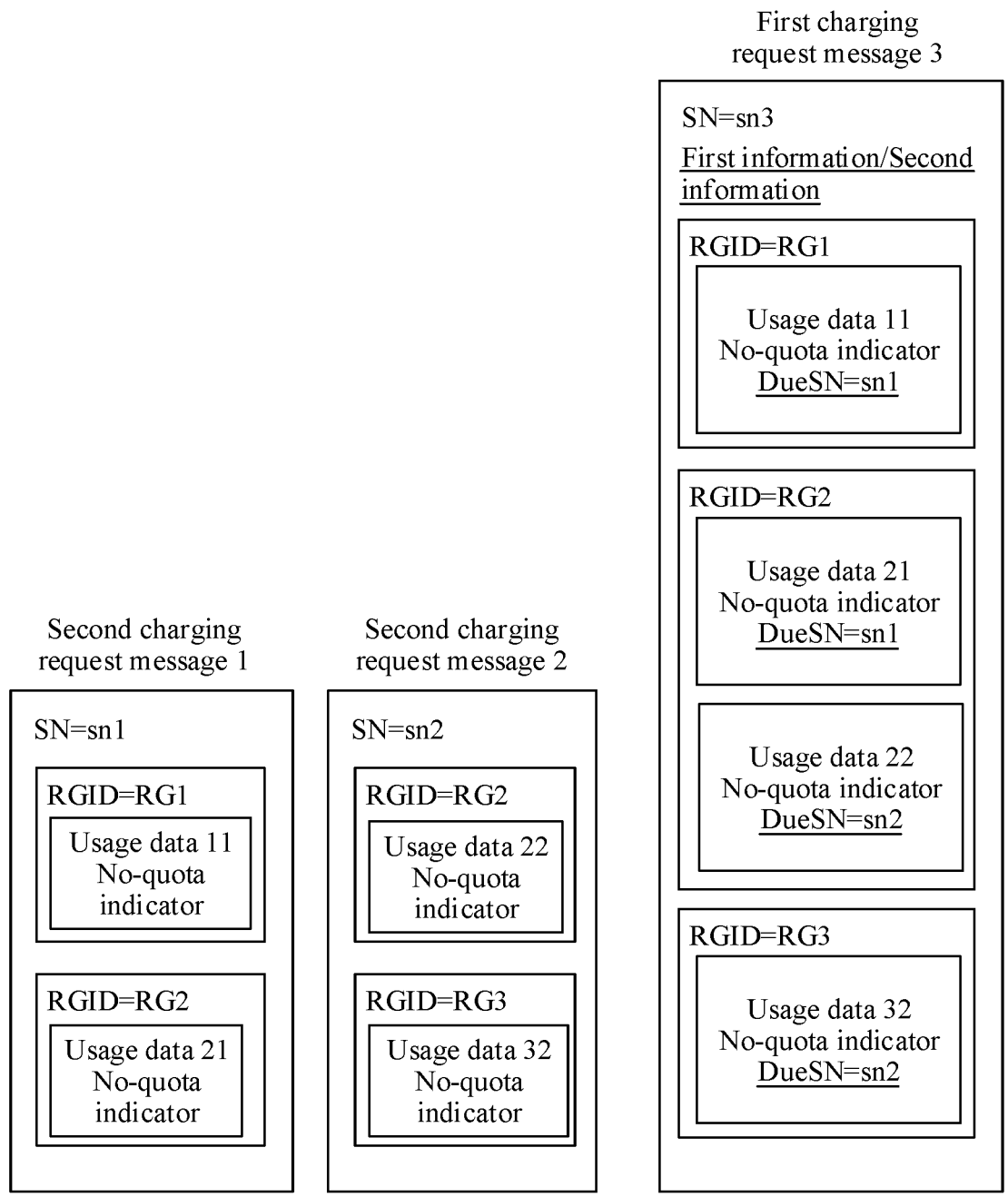
FIG. 6B is a fourth schematic diagram of composition and a source of a first charging request message according to an embodiment of this application.

FIG. 6B is a fourth schematic diagram of composition and a source of a first charging request message according to an embodiment of this application, and is used to describe the method for obtaining the first charging request message in the foregoing embodiments. A charging mode of a user service is offline charging, and a charging trigger device obtains one corresponding first charging request message based on a plurality of second charging request messages. Details are described as follows:

In a process of obtaining a first charging request message 3 based on a second charging request message 1 and a second charging request message 2, the charging trigger device copies usage data, a no-quota indicator, and the like in each of the second charging request message 1 and the second charging request message 2 into the created first charging request message 3. In addition, for usage data corresponding to each rating group, the charging trigger device further sets a message serial number (referring to "Due SN" in FIG. 6B) of the second charging request message 1 or the second charging request message 2 corresponding to the usage data, to determine data retransmission. For example, a DueSN of usage data 11 is a serial number sn1 of the second charging request message 1, and a DueSN of usage data 22 is a serial number sn2 of the second charging request message 2.

It should be understood that, in FIG. 6B, the DueSN and a charging resource identifier in the first charging request message 3 jointly constitute third information.

In FIG. 6B, because both the charging trigger device and an available charging processing device may implement charging processing by processing relatively few first charging request messages, the method for obtaining one first charging request message based on a plurality of second charging request messages helps improve processing efficiency of the charging trigger device and the charging processing device.

Figure 6C:
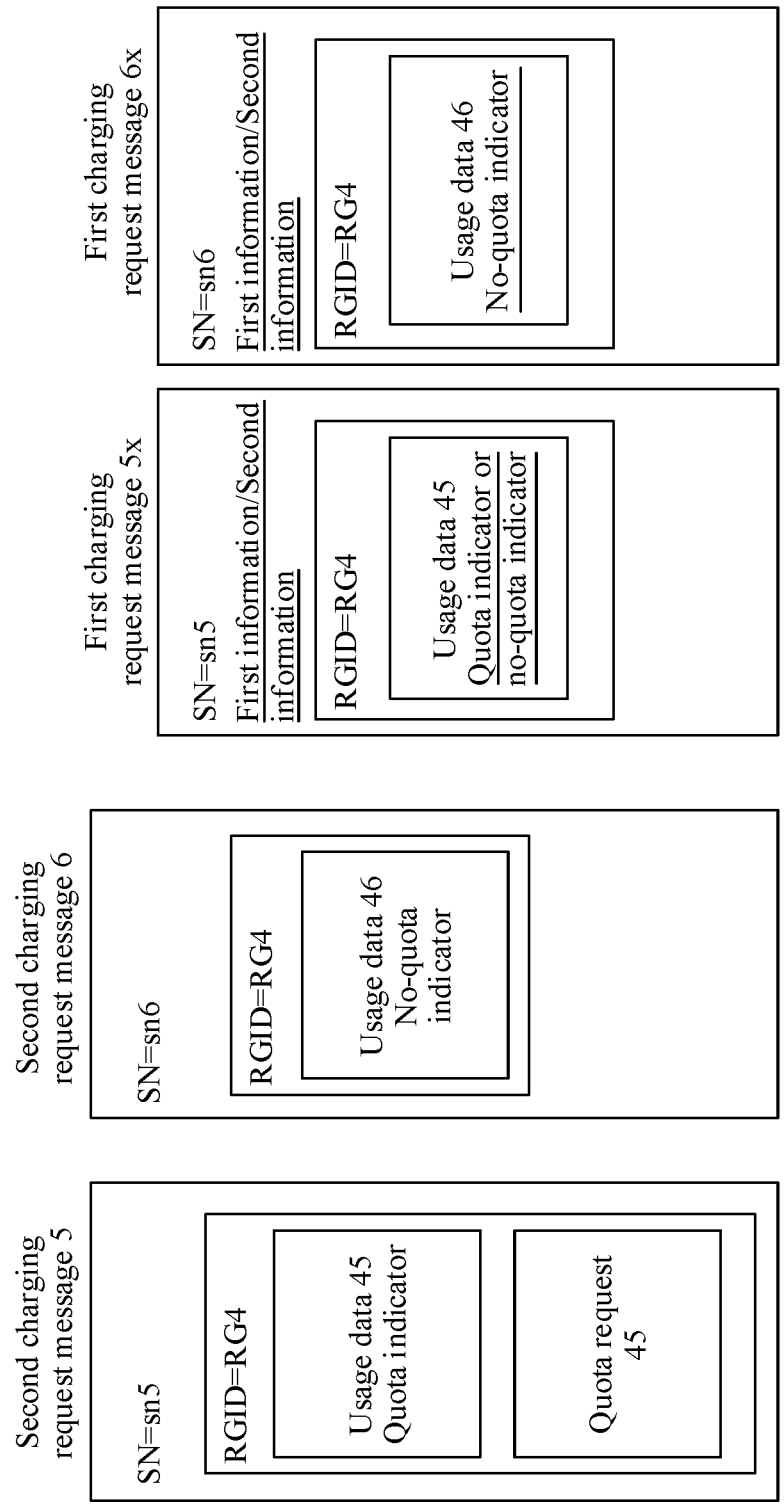
FIG. 6C is a fifth schematic diagram of composition and a source of a first charging request message according to an embodiment of this application.

FIG. 6C is a fifth schematic diagram of composition and a source of a first charging request message according to an embodiment of this application, and is used to describe the method for obtaining the first charging request message in the foregoing embodiments. A charging mode of a user service is online charging and offline charging, and a charging trigger device obtains one corresponding first charging request message based on one second charging request message. Details are described as follows:

As shown in FIG. 6C, a second charging request message 5 and a second charging request message 6 are charging request messages that need to be sent by the charging trigger device to a charging processing device respectively at a moment t5 and a moment t6. However, because the charging processing device is unavailable, the second charging request message 5 and the second charging request message 6 are not sent. Alternatively, although the second charging request message 5 and the second charging request message 6 are sent, the charging trigger device does not receive a corresponding response message. A serial number of the second charging request message 5 is sn5, which corresponds to the moment t5. The second charging request message 5 includes one piece of usage data and one quota request: usage data 45 corresponding to a rating group RG4 and a quota request 45. Because the charging mode of the user service includes online charging, the usage data 45 carries a quota indicator, to indicate that the usage data 45 is usage data with quota control. The second charging request message 6 corresponds to offline charging, and a quota indicator corresponding to usage data 46 carried in the second charging request message 6 is a no-quota indicator, to indicate that the usage data 46 is usage data without quota control.

A process in which the charging trigger device generates a first charging request message 5x based on the second charging request message 5 may be as follows: The charging trigger device creates the first charging request message 5x or directly modifies the second charging request message 5 to obtain the first charging request message 5x. The first charging request message 5x includes the usage data 45 corresponding to the rating group RG4 in the second charging request message 5, and a corresponding quota indicator is a quota indicator or a no-quota indicator. Similarly, the charging trigger device may further add the first information and/or the second information described above to the first charging request message 5x. If the charging trigger device has sent the second charging request message 5 but does not receive a corresponding response message, the charging trigger device may further add a retransmission indicator to the first charging request message 5x. The serial number sn5 of the second charging request message 5 may be used as a serial number of the first charging request message 5x, so that the available charging processing device can determine, based on the sn5 and a charging resource identifier in the first charging request message 5x, whether charging processing has been performed on charging data in the first charging request message 5x. In addition, according to a fault processing policy preconfigured on the charging trigger device or a fault processing policy delivered by the charging processing device to the charging trigger device, the charging trigger device may modify the quota indicator of the usage data 45 in the first charging request message into a no-quota indicator, to indicate the available charging processing device, to perform charging processing on the usage data 45 as usage data without a quota. It should be noted that the quota request 45 in the second charging request message may not be included in the first charging request message 5x. A process in which the charging trigger device generates a first charging request message 6x based on the second charging request message 6 is similar to the process in FIG. 6A, and details are not described again.

In the foregoing example, the second charging request message includes the usage data. However, actually, the second charging request message may include no usage data, but includes only a quota request. In this case, if the second charging request message is a charging resource creation request message, a corresponding first charging request message created by the charging trigger device is also a charging resource creation request message. If the second charging request message is a charging resource update request message, the charging trigger device may not create a corresponding first charging request message.

It should be understood that, in FIG. 6C, the sn5 and the charging resource identifier in the first charging request message 5x jointly constitute third information.

In FIG. 6C, the method for obtaining one corresponding first charging request message based on one second charging request message helps ensure a sending sequence of the first charging request message, and avoid a charging error during charging processing. In addition, the charging trigger device may convert usage data with a quota indicator into usage data without a quota, so that both processing complexity of the charging trigger device and processing complexity of the charging processing device can be reduced.

Figure 6D:
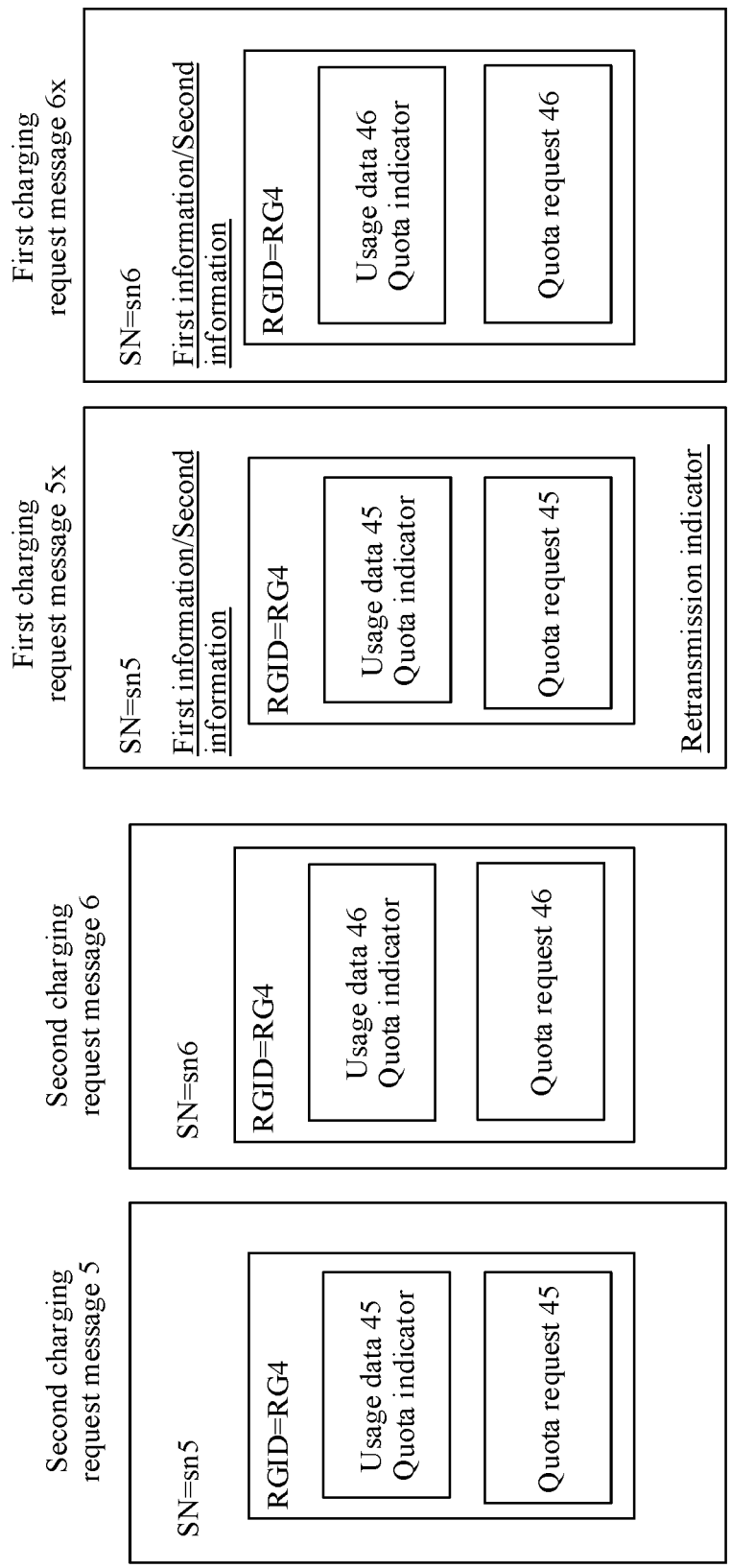
FIG. 6D is a sixth schematic diagram of composition and a source of a first charging request message according to an embodiment of this application.

FIG. 6D is a sixth schematic diagram of composition and a source of a first charging request message according to an embodiment of this application, and is used to describe the method for obtaining the first charging request message in the foregoing embodiments. A charging mode of a user service is online charging, and a charging trigger device obtains one corresponding first charging request message based on one second charging request message. Usage data in the second charging request message is usage data with a virtual quota. Details are described as follows:

As shown in FIG. 6D, a second charging request message 5 is the same as that in FIG. 6C. Because the charging trigger device does not receive a quota granted by a charging processing device and corresponding to a quota request 45, although a quota indicator of usage data 46 in a second charging request message 6 is a quota indicator, actually, the usage data is not usage data corresponding to a quota granted by the charging processing device, but is usage data corresponding to a virtual quota of the charging trigger device. The second charging request message 6 further includes a quota request 46.

When the charging trigger device obtains a first charging request message 5x based on the second charging request message 5 and obtains a first charging request message 6x based on the second charging request message 6, in addition to the usage data and the quota indicator, the charging trigger device further copies or retains the quota request 45 and the quota request 46.

It should be understood that, in FIG. 6D, sn5, a charging resource identifier, and a retransmission indicator in the first charging request message 5x jointly constitute third information.

Using the virtual quota in FIG. 6D can reduce a risk of a loss caused for an operator when a user uses an excessively large quantity of services.

Figure 7:
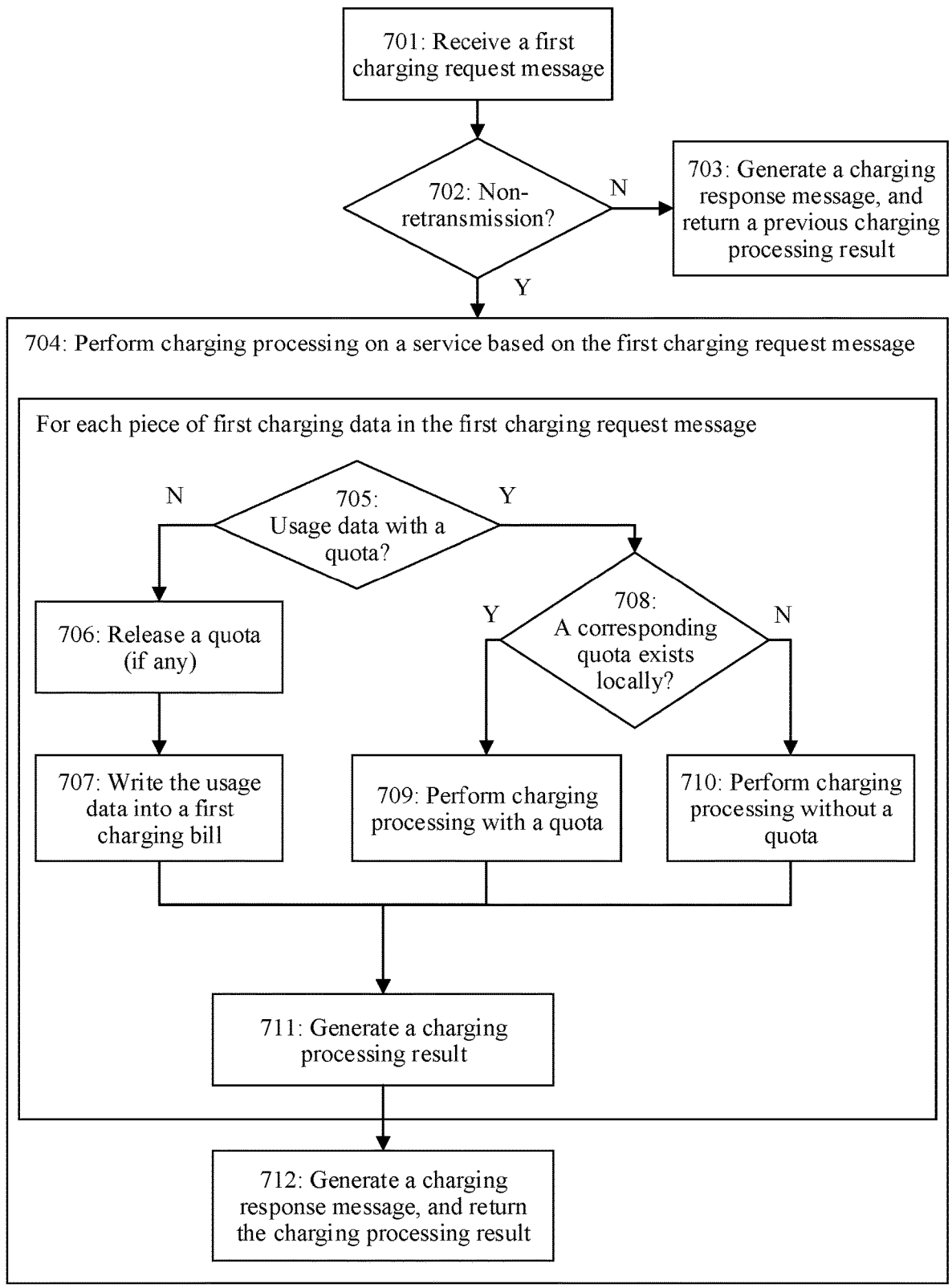
FIG. 7 is a flowchart of a method for performing charging processing by a charging processing device according to an embodiment of this application.

FIG. 7 is a flowchart of a method for performing charging processing by a charging processing device according to an embodiment of this application. The method procedure is implemented based on the architecture shown in FIG. 1. A charging trigger device corresponds to the charging trigger device 102 in FIG. 1. The available charging processing device corresponds to the charging processing device 101 in FIG. 1 or an alternative device (not shown in the figure) of the charging processing device 101. In the method, the charging processing device receives a first charging request message, and performs charging processing based on the first charging request message. The method includes the following steps.

Step 701: The charging processing device receives a first charging request message.

Specifically, the charging processing device receives the first charging request message from the charging trigger device. The first charging request message may be the charging resource creation request message, the charging resource update request message, or the charging resource deletion request message described above.

The first charging request message includes first charging data and/or first information of a user service.

The first charging data includes charging data that is not sent or charging data that is not processed because a charging processing device for the user service is unavailable. The charging data that is not sent is charging data that is not sent by the charging trigger device to a charging processing device, and the charging data that is not processed is charging data for which the charging trigger device does not receive a charging processing result from a charging processing device. In this case, the first charging request message may further include second information, and the second information indicates that the first charging request message includes the first charging data. If the second information includes a charging resource identifier created before the charging processing device for the user service is unavailable, the charging processing device may perform charging correlation processing based on the charging resource identifier. To be specific, the charging processing device may associate, based on the resource identifier, the first charging data with a charging resource created before the charging processing device for the user service is unavailable, combine the first charging data and charging data of the user service before the charging processing device is unavailable for processing, and implement complete charging processing for use of the user service.

The first information indicates that a reason for reporting the first charging request message is that a charging processing device for the user service transitioned to "available". Specifically, the first information may be carried in the first charging request message as a message-level parameter, that is, the first information functions for the entire first charging request message. Optionally, the first information may be carried in the first charging data, that is, the first information functions for the first charging data, and is used to indicate that a reason for reporting the first charging data is that a charging processing device for the user service transitioned to "available".

Specifically, the charging processing device determines that the first charging request message includes the first charging data, for example, determines, based on the first information and/or the second information included in the first charging request message, that the message includes the first charging data. Alternatively, the charging processing device determines, through reasoning based on information such as a charging reporting type and a timestamp of charging data in the request message, that the charging request message includes the first charging data. For example, if the charging reporting type is immediate reporting, and a difference between the timestamp in the charging request message and a current time exceeds a preset threshold, the charging processing device may determine that the corresponding charging data is the first charging data described above.

Optionally, if the first charging request message is a charging resource update request message or a charging resource deletion request message, the charging processing device may further obtain a charging resource identifier from the first charging resource request message, and determine whether the charging processing device locally stores a charging resource corresponding to the charging resource identifier. If the charging processing device does not locally store the charging resource corresponding to the charging resource identifier, the charging processing device may create the corresponding charging resource based on the first charging request message.

Optionally, if the first charging request message is a charging resource creation request message, the charging resource creation request message may carry usage data of the user service and indicate that the usage data is usage data with a quota (in this case, a service unit quota corresponding to the usage data with a quota does not exist in the charging processing device locally, and step 712 is performed). Alternatively, if the first charging request message carries usage data of the service and indicates that the usage data is usage data without a quota, the charging processing device may create a new charging resource based on a user identifier, service information, and the like that are carried in the first charging request message.

Step 702: The charging processing device determines that the first charging data in the first charging request message is not retransmitted charging data.

This step is an optional step, and step 704 may be directly performed.

Specifically, the charging processing device may determine, based on third information in the first charging request message, that the first charging data is not retransmitted charging data, that is, the charging processing device has not successfully completed charging processing on the first charging data. The charging processing is charging processing described in step 707, step 709, or step 710.

When the first charging request message is a charging resource creation request message, the third information may be unique identification information of the user service. For example, if the user service is a 5G data connection service, the unique identification information of the user service may be a combination of a user identifier and a PDU session identifier, or a combination of a user identifier, a PDU session identifier, and an SMF device identifier. In this case, the "determining that the first charging data in the first charging request message is not retransmitted charging data" is specifically: The charging processing device determines, based on the unique identification information of the user service, that there is no charging resource created based on the first charging data in the charging processing device.

When the first charging request message is a charging resource update request message or a charging resource deletion request message, the third information may be a combination of a charging resource identifier and a serial number (that is, a serial number of the first charging request message or a serial number of the first charging data). In this case, the "determining that the first charging data in the first charging request message is not retransmitted charging data" is specifically: The charging processing device determines that a processing record of the serial number on a charging resource corresponding to the charging resource identifier does not exist locally (when the first charging request message is generated based on a plurality of second charging request messages, the serial number is a serial number (that is, the DueSN described above) corresponding to each piece of first charging data in the first charging request message), to determine that the first charging data in the first charging request message is not retransmitted charging data.

Optionally, the charging processing device may not need to perform retransmission determining on first charging data in each first charging request message, but may perform the foregoing retransmission determining after determining that the third information further includes a retransmission indicator. In this way, because the charging processing device may perform retransmission determining only on first charging data that carries a retransmission indicator, load of the charging processing device can be relieved. It should be understood that, when the third information includes a retransmission indicator, the charging processing device may not necessarily determine that the first charging data is retransmitted charging data, because the charging trigger device has sent corresponding charging data, but the charging processing device may not necessarily successfully receive the charging data due to factors such as a network fault. Therefore, the charging processing device further needs to determine, based on the charging resource identifier and the serial number in the third information, whether the first charging data is retransmitted charging data.

If it is determined that the first charging data is retransmitted charging data in the foregoing step (it means that charging processing has been performed on the first charging data), step 703 is performed, or if it is determined that the first charging data is not retransmitted charging data in the foregoing step, step 704 is performed.

Step 703: The charging processing device generates a charging response message, and returns a previous charging processing result.

Specifically, because the charging processing device has previously processed the first charging data in the first charging request message, to avoid repeated charging processing, the charging processing device may directly generate a charging response message, where the charging response message includes a previous charging processing result, and return the charging response message to the charging trigger device. If the first charging request message is a charging resource creation message, the returned response further includes a previously created charging resource identifier.

Step 704: Perform charging processing on the user service based on the first charging request message.

Specifically, for each piece of first charging data in the first charging request message, the charging processing device performs the charging processing process in steps 705 to 711. It should be noted that a sequence of steps 705 to 711 is merely an example, but not a limitation.

Step 705: The charging processing device determines whether usage data of the user service that is included in the first charging data in the first charging request message is indicated as usage data with a quota or usage data without a quota.

Specifically, if the charging processing device determines that the first charging data in the first charging request message includes the usage data of the user service, and the first charging data indicates that the usage data is usage data without a quota (for example, the first charging data does not include a quota indicator or includes a no-quota indicator), the charging processing device performs steps 706 to 711. If the charging processing device determines that the first charging data in the first charging request message includes the usage data of the user service, and the first charging data indicates that the usage data is usage data with a quota (for example, the first charging data includes a quota indicator), the charging processing device performs steps 708 to 711.

Step 706: The charging processing device releases a quota (if any).

Specifically, if the first charging data in the first charging request message includes the usage data of the user service, and the first charging data indicates that the usage data is usage data without a quota, the charging trigger device may modify online charging into offline charging, that is, the charging processing device may have previously granted a quota. Therefore, the charging processing device further needs to release a service unit quota corresponding to the usage data and existing in the charging processing device. Optionally, the charging processing device may determine, based on a rate group identifier of the usage data and a serial number in the first charging request message (including a serial number of the first charging request message or a due serial number DueSN of the usage data), whether a corresponding quota is stored. Therefore, the charging processing device may correspondingly store the quota, the rating group identifier, and the serial number in advance. When determining that there is a corresponding quota, the charging processing device may release the quota, for example, refund an amount in the quota to a user account.

Step 707: The charging processing device writes the usage data into a first charging data record.

Specifically, the charging processing device writes the usage data in the first charging data into the first charging data record (for example, an offline charging data record). Further, if the charging processing device determines that the first charging data record does not exist locally, the charging processing device needs to first create the first charging data record based on the first charging request message.

In this case, step 711 is performed.

Step 708: The charging processing device determines whether a service unit quota corresponding to the usage data with a quota exists locally.

Specifically, if the charging processing device determines that the service unit quota corresponding to the usage data with a quota exists locally, step 709 is performed, or if the charging processing device determines that the service unit quota corresponding to the usage data with a quota does not exist locally, step 710 is performed.

Specifically, the charging processing device searches for a corresponding locally stored granted quota based on information included in the first charging data. For example, for a data connection service, the charging processing device searches for a locally stored granted quota corresponding to an RG in the first charging data. If the granted quota is found, the charging processing device determines that the service unit quota corresponding to the usage data with a quota exists locally, or if the granted quota is not found, the charging processing device determines that the service unit quota corresponding to the usage data with a quota does not exist locally.

Step 709: The charging processing device performs charging processing with a quota on the usage data with a quota.

Specifically, the charging processing device performs deduction processing on the user account based on the usage data and a user service unit quota. For example, for a data connection service, if a locally stored quota is 5 M, and usage in the usage data is 4 M, used 4 M is deducted from the user account, and unused 1 M is unlocked or refunded to the user account.

Step 710: The charging processing device performs charging processing without a quota on the usage data with a quota.

Specifically, the charging processing device performs deduction processing on the user account based on the usage data. For example, if usage in the usage data is 4 M, 4 M is directly deducted from the user account. In this case, the deduction may fail, and the charging processing device writes usage data for which deduction fails into a second charging data record. The second charging data record includes charging data on which charging processing is not performed.

Step 711: The charging processing device generates a charging processing result.

Specifically, the charging processing device generates a charging processing result based on the processing result in step 709, step 711, or step 712. For example, "200 OK" indicates that the charging processing succeeds.

Step 712: The charging processing device generates a charging response message, and returns the charging processing result.

Specifically, the charging processing device generates a charging response message corresponding to the charging request message in step 701, where the charging response message includes the charging processing result generated in step 711, and sends the charging response message to the charging trigger device. For example, if the first charging request message received in step 701 is a charging resource creation request message, the charging response message herein is a charging resource creation response message. If the first charging request message received in step 701 is a charging resource update request message, the charging response message herein is a charging resource update response message.

Optionally, before receiving the first charging request message, the charging processing device may send a fault processing policy to the charging trigger device. The fault processing policy is used to indicate the charging trigger device to send, after a charging processing device for the user service transitioned from "unavailable" to "available", the first charging request message of the user service to the available charging processing device. In this way, the charging trigger device may prepare to send the first charging request message when the charging processing device for the user service is unavailable. As described above, the charging trigger device obtains the first charging request message based on the second charging request message, or generates the first charging request message based on the collected usage data, or stores the collected charging data (that is, the charging data that is not sent). Then, after determining that a charging processing device for the user service transitioned from "unavailable" to "available", the charging trigger device sends the first charging request message to the available charging processing device. It should be understood that the charging processing device may further send a fault processing policy different from the foregoing indicated fault processing policy to the charging trigger device, to control another corresponding operation performed by the charging trigger device when the charging processing device for the user service is unavailable. For example, the fault processing policy may be further used to indicate the charging trigger device to interrupt the user service or unconditionally allow the user service when the charging processing device for the user service is unavailable. Examples are not listed one by one in this embodiment of this application.

Figure 8:
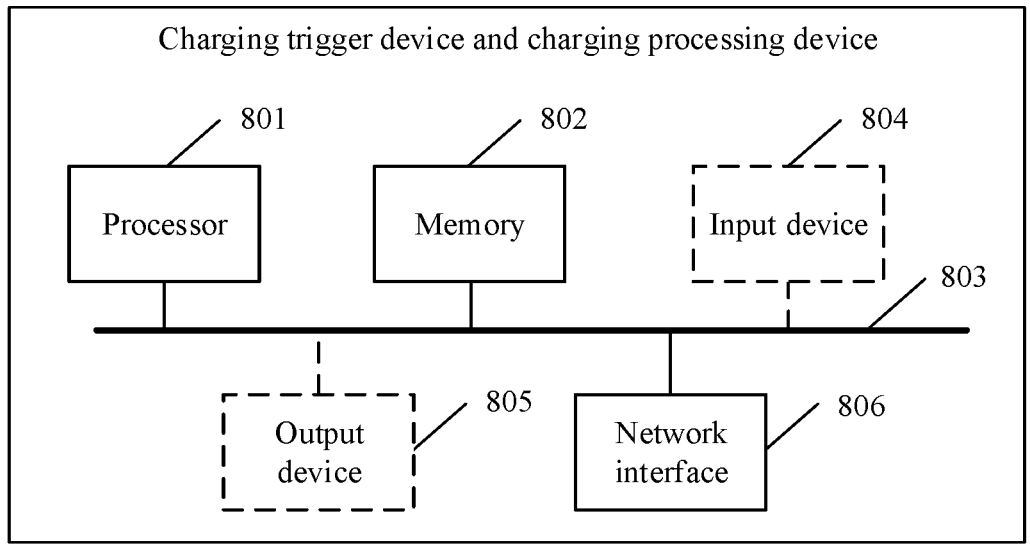
FIG. 8 is a structural diagram of hardware of a charging trigger device or a charging processing device according to an embodiment of this application.

FIG. 8 is a structural diagram of hardware of a charging trigger device or a charging processing device according to an embodiment of this application. All charging trigger devices (for example, the charging trigger device 102 in FIG. 1) and all charging processing devices (for example, the charging processing device 101 in FIG. 1) in the embodiments of this application may use general computer hardware shown in FIG. 8. The general computer hardware includes a processor 801, a memory 802, a bus 803, an input device 804, an output device 805, and a network interface 806. The input device 804 and the output device 805 are optional.

Specifically, the memory 802 may include a computer storage medium in a form of a volatile and/or nonvolatile memory, for example, a read-only memory and/or a random access memory. The memory 802 can store an operating system, an application program, another program module, executable code, and program data.

The input device 804 may be configured to input information, so that a system administrator operates and manages the charging trigger device or the charging processing device, for example, configures a fault processing policy on the charging processing device. The input device 804 may be a keyboard or a pointing device, for example, a mouse, a trackball, a touchpad, a microphone, a joystick, a game pad, a satellite TV antenna, a scanner, or a similar device. The input device may be connected to the processor 801 through the bus 803.

The output device 805 may be configured to output information, so that the system administrator operates and manages the charging trigger device or the charging processing device. The output device 805 may be a monitor, or another peripheral output device, for example, a speaker and/or a print device. The output device may also be connected to the processor 801 through the bus 803.

The charging trigger device or the charging processing device may access a network, for example, a local area network (Local Area Network, LAN) through the network interface 806. In a network access environment, a computer-executable instruction stored in the device is not limited to being locally stored, but may be stored in a remote storage device.

For the charging trigger device, when the processor 801 executes the executable code or the application program stored in the memory 802, the charging trigger device may perform the method steps corresponding to the charging trigger device in all the foregoing embodiments, for example, steps 201, 302, 313, 401, 451, and 471. For a specific execution process, refer to the foregoing embodiments. Details are not described herein again.

For the charging processing device, when the processor 801 executes the executable code or the application program stored in the memory 802, the charging processing device may perform the method steps corresponding to the charging processing device in all the foregoing embodiments, for example, steps 203 and 701. For a specific execution process, refer to the foregoing embodiments. Details are not described herein again.

Figure 9:
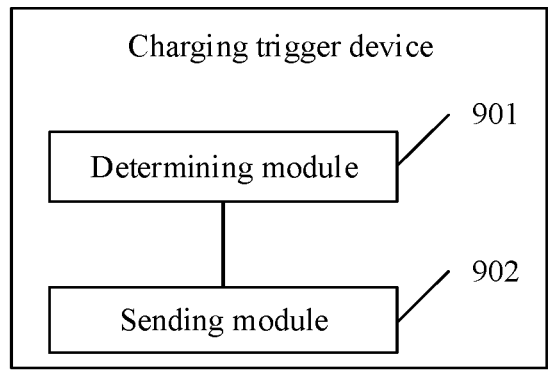
FIG. 9 is a schematic structural diagram of a charging trigger device according to an embodiment of this application.

FIG. 9 is a schematic structural diagram of a charging trigger device according to an embodiment of this application. The charging trigger device includes a determining module 901 and a sending module 902.

The determining module 901 is configured to determine that a charging processing device for a user service transitioned from "unavailable" to "available". For a specific execution process, refer to the step description of the charging trigger device in the foregoing embodiment, for example, step 201.

The sending module 902 is configured to send a first charging request message to the available charging processing device, and the first charging request message includes the first charging data and/or the first information described in the foregoing embodiments. For a specific execution process, refer to the step descriptions of the charging trigger device in the foregoing embodiments, for example, steps 202 and 487.

In this embodiment, the charging trigger device is presented in a form of a function module. The "module" herein may be an application-specific integrated circuit (application-specific integrated circuit, ASIC), a circuit, a processor and a memory for executing one or more software or firmware programs, an integrated logic circuit, and/or another device that can provide the foregoing function. In a simple embodiment, a person skilled in the art may figure out that the charging trigger device may alternatively be in a form shown in FIG. 8. Both the determining module 901 and the sending module 902 may be implemented by the processor 801 and the memory 802 in FIG. 8. For example, the function of determining, by the determining module 901, that a charging processing device for the user service transitioned from "unavailable" to "available" may be implemented by the processor 801 by executing the code stored in the memory 802.

Figure 10:
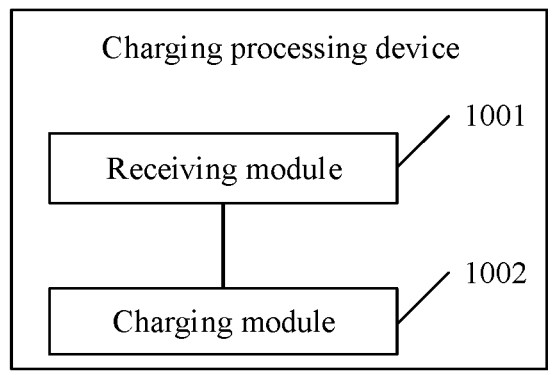
FIG. 10 is a schematic structural diagram of a charging processing device according to an embodiment of this application.

FIG. 10 is a schematic structural diagram of a charging processing device according to an embodiment of this application. The charging processing device includes a receiving module 1001 and a charging module 1002.

The receiving module 1001 is configured to receive a first charging request message from a charging trigger device, and the first charging request message includes the first charging data and/or the first information described in the foregoing embodiments. For a specific execution process, refer to the step descriptions of the charging processing device in the foregoing embodiments, for example, steps 202, 203, and 701.

The charging module 1002 is configured to perform charging processing on a user service based on the first charging request message. For a specific execution process, refer to the step descriptions of the charging processing device in the foregoing embodiments, for example, steps 203, 713, and 714.

In this embodiment, the charging processing device is presented in a form of a function module. The "module" herein may be an application-specific integrated circuit (application-specific integrated circuit, ASIC), a circuit, a processor and a memory for executing one or more software or firmware programs, an integrated logic circuit, and/or another device that can provide the foregoing function. In a simple embodiment, a person skilled in the art may figure out that the charging processing device may alternatively be in a form shown in FIG. 8. Both the receiving module 1001 and the charging module 1002 may be implemented by the processor 801 and the memory 802 in FIG. 8. For example, the function of performing charging processing by the charging module 1002 based on the first charging request message may be implemented by the processor 801 by executing the code stored in the memory 802.

A person of ordinary skill in the art may be aware that, the units and steps in the examples described with reference to the embodiments disclosed herein may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions in this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, for example a USB flash drive, a removable hard disk, a read-only memory, a random access memory, a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A charging method, performed by a charging trigger device, wherein the method comprises:
   determining that a charging processing device for a user service transitioned from "unavailable" to "available"; and
   sending a first charging request message for the user service to the available charging processing device, wherein the first charging request message comprises at least one of first charging data or first information of the user service; wherein
   the first charging data comprises charging data that is not sent or charging data that is not processed because a charging processing device for the user service was unavailable, wherein the charging data that is not sent is charging data that is not sent by the charging trigger device to any charging processing device, and the charging data that is not processed is charging data for which the charging trigger device does not receive a charging processing result from a charging processing device; and
   the first information indicates that a reason for reporting the first charging request message is that a charging processing device for the user service transitioned to "available".

2. The method according to claim 1, wherein before the sending the first charging request message to the available charging processing device, the method further comprises:
   determining that no charging processing device for the user service is available; and
   obtaining the first charging request message based on a second charging request message, wherein the second charging request message is a charging request message that is not sent or a charging request message for which no response is received because a charging processing device for the user service was unavailable, wherein the charging request message that is not sent is a charging request message that is not sent by the charging trigger device to any charging processing device, and the charging request message for which no response is received is a charging request message for which the charging trigger device does not receive a charging response message from a charging processing device.

3. The method according to claim 2, wherein the second charging request message comprises usage data of the user service and a corresponding with-a-quota indicator indicating that the usage data is that corresponding to an available service unit quota, and either the first charging data in the first charging request message comprises the usage data and the with-a-quota indicator, or the first charging data in the first charging request message comprises the usage data and the first charging data indicates that the usage data is corresponding to no available service unit quota.

4. The method according to claim 2, wherein the first charging request message comprises the first charging data of the user service, the first charging request message further comprises third information, and the third information is used to determine that the first charging data is retransmitted data.

5. The method according to claim 1, wherein before the sending the first charging request message to the available charging processing device, the method further comprises:
   determining that no charging processing device for the user service is available;
   obtaining usage data of the user service; and
   obtaining the first charging request message based on the usage data.

6. The method according to claim 5, wherein:
   a charging mode of the user service is online charging, and the method further comprises performing an online charging operation on the user service to obtain the usage data, wherein the first charging data in the first charging request message comprises the usage data and a with-a-quota indicator indicating that the usage data is corresponding to an available service unit quota; or
   performing an offline charging operation on the user service to obtain the usage data, wherein the first charging data in the first charging request message comprises the usage data, and the first charging data indicates that the usage data is corresponding to no available service unit quota.

7. The method according to claim 1, wherein before the sending the first charging request message to the available charging processing device, the method further comprises:
   obtaining a fault processing policy, wherein the fault processing policy indicates the charging trigger device to send, after the charging processing device for the user service transitions from "unavailable" to "available", the first charging request message for the user service to the available charging processing device; and
   the obtaining a fault processing policy comprises:
      reading the fault processing policy from local configuration information; or
      receiving the fault processing policy from the charging processing device; or
      receiving the fault processing policy from a policy control function PCF device.

8. A charging method, performed by a charging processing device, wherein the method comprises:
   receiving a first charging request message for a user service from a charging trigger device, wherein the first charging request message comprises at least one of first charging data or first information of the user service; and
   performing charging processing on the user service based on the first charging request message; wherein
   the first charging data comprises charging data that is not sent or charging data that is not processed because a charging processing device for the user service was unavailable, wherein the charging data that is not sent is charging data that is not sent by the charging trigger device to any charging processing device, and the charging data that is not processed is charging data for which the charging trigger device does not receive a charging processing result from a charging processing device; and
   the first information indicates that a reason for reporting the first charging request message is that a charging processing device for the user service transitioned to "available".

9. The method according to claim 8, wherein the first charging request message comprises the first charging data, the first charging request message further comprises second information, and the second information indicates that the first charging request message comprises the first charging data.

10. The method according to claim 8, wherein the first charging data in the first charging request message comprises usage data of the user service, the first charging data indicates that the usage data is corresponding to no available service unit quota, and the performing charging processing on the user service based on the first charging request message comprises:
determining that a first charging data record corresponding to the user service does not exist in the charging processing device; and
creating the first charging data record based on the first charging request message.

11. The method according to claim 8, wherein the first charging data in the first charging request message comprises usage data of the user service, the first charging data indicates that the usage data is usage data without a quota, the method further comprises:
releasing a service unit quota corresponding to the usage data and existing in the charging processing device.

12. The method according to claim 8, wherein the first charging data in the first charging request message comprises usage data of the user service and a with-a-quota indicator, and the performing charging processing on the user service based on the first charging request message comprises:
determining that a service unit quota corresponding to the usage data does not exist in the charging processing device; and
performing deduction processing on a user account based on the usage data.

13. The method according to claim 8, wherein the first charging request message is a charging resource update request message or a charging resource deletion request message, the first charging request message further comprises a charging resource identifier, and the performing charging processing on the user service based on the first charging request message further comprises:
when a charging resource corresponding to the charging resource identifier does not exist in the charging processing device, creating the charging resource based on the first charging request message.

14. The method according to claim 8, wherein before the performing charging processing on the user service based on the first charging request message, the method further comprises:
determining that the first charging data in the first charging request message is not retransmitted charging data.

15. The method according to claim 8, wherein the first charging request message is a charging resource creation request message, the first charging data comprises service information of the user service, and the performing charging processing on the user service based on the first charging request message further comprises:
determining, based on the service information of the user service, whether a charging resource corresponding to the first charging data exists in the charging processing device.

16. The method according to claim 15, wherein it is determined that the charging resource corresponding to the first charging data exists in the charging processing device, and the method further comprises:
generating a charging response message, wherein the charging response message comprises an identifier of the charging resource corresponding to the first charging data and existing in the charging processing device.

17. The method according to claim 8, wherein before the receiving a first charging request message, the method further comprises:
sending a fault processing policy to the charging trigger device, wherein the fault processing policy is used to indicate the charging trigger device to send, after a charging processing device for the user service transitioned from "unavailable" to "available", the first charging request message for the user service to the available charging processing device.

18. A charging processing device, comprising at least one processor and a memory, wherein
the memory is configured to store a program, and wherein the program, when executed by the at least one processor, causes the charging processing device to:
receive a first charging request message for a user service from a charging trigger device, wherein the first charging request message comprises at least one of first charging data or first information of the user service; and
perform charging processing on the user service based on the first charging request message; wherein
the first charging data comprises charging data that is not sent or charging data that is not processed because a charging processing device for the user service was unavailable, wherein the charging data that is not sent is charging data that is not sent by the charging trigger device to any charging processing device, and the charging data that is not processed is charging data for which the charging trigger device does not receive a charging processing result from a charging processing device; and
the first information indicates that a reason for reporting the first charging request message is that a charging processing device for the user service transitioned to "available".

19. The charging processing device according to claim 18, wherein the first charging request message comprises the first charging data, the first charging request message further comprises second information, and the second information indicates that the first charging request message comprises the first charging data.

20. The charging processing device according to claim 18, wherein the first charging data in the first charging request message comprises usage data of the user service, and the first charging data indicates that the usage data is corresponding to no available service unit quota, the program further causes the charging processing device to:
determine that a first charging data record corresponding to the user service does not exist in the charging processing device; and
create the first charging data record based on the first charging request message.

21. A computer-readable storage medium, wherein the computer-readable storage medium comprises a computer program or instructions, and when the computer program or the instructions are run on a computer, the communication method is performed as following:
receive a first charging request message for a user service from a charging trigger device, wherein the first charging request message comprises at least one of first charging data or first information of the user service; and
perform charging processing on the user service based on the first charging request message;

wherein the first charging data comprises charging data that is not sent or charging data that is not processed because a charging processing device for the user service was unavailable, wherein the charging data that is not sent is charging data that is not sent by the charging trigger device to any charging processing device, and the charging data that is not processed is charging data for which the charging trigger device does not receive a charging processing result from a charging processing device; and the first information indicates that a reason for reporting the first charging request message is that a charging processing device for the user service transitioned to "available".

* * * * *